(12) United States Patent
Griffin et al.

(10) Patent No.: US 7,496,687 B2
(45) Date of Patent: *Feb. 24, 2009

(54) ENTERPRISE APPLICATION PLATFORM

(75) Inventors: Philip B. Griffin, Longmont, CO (US); Troy Hallock, Superior, CO (US); Brad Posner, Erie, CO (US); Patrick Osborne, Boulder, CO (US); Olivier Libouban, Lafayette, CO (US); Manish Devgan, Bloomfield, CO (US); Ravi Rohra, Harrison, NJ (US); Jitendra Gupta, Iselin, NJ (US); Somenath Sengupta, Boulder, CO (US); Hung T. Ma, Bridgewater, NJ (US); Chengjiang Lin, Bridgewater, NJ (US)

(73) Assignee: BEA Systems, Inc., Redwood Shores, CA (US)

( * ) Notice: Subject to any disclaimer, the term of this patent is extended or adjusted under 35 U.S.C. 154(b) by 685 days.

This patent is subject to a terminal disclaimer.

(21) Appl. No.: 10/427,119

(22) Filed: May 1, 2003

(65) Prior Publication Data

US 2004/0068568 A1 Apr. 8, 2004

Related U.S. Application Data

(60) Provisional application No. 60/376,913, filed on May 1, 2002.

(51) Int. Cl.
*G06F 15/16* (2006.01)
(52) U.S. Cl. .............................. 709/249; 715/234; 705/1
(58) Field of Classification Search ................. 709/203, 709/250, 246, 249; 705/64, 37, 1, 35, 9; 719/313, 310; 715/742, 234
See application file for complete search history.

(56) References Cited

U.S. PATENT DOCUMENTS 5,173,939 A 12/1992 Abadi et al. .................. 380/25

(Continued)

FOREIGN PATENT DOCUMENTS

EP 1 256 889 A 11/2002

(Continued)

OTHER PUBLICATIONS

Managing Enterprise Information Portal, Version 7.1, Aug. 2000.*

(Continued)

*Primary Examiner*—Jungwon Chang
(74) *Attorney, Agent, or Firm*—Fliesler Meyer LLP

(57) ABSTRACT

A business platform can provide access to applications and provide for the integration of resources with other applications, including internal and external applications, services and systems. A portal framework included within the platform can render portals including graphical user interfaces for displaying and receiving content that can be used by various applications. A portal framework can provide an interface to various resources such that information received and displayed by the portal framework can be exchanged with internal and external resources using standards-based transport protocols, messaging systems, and document types. An integration framework can be invoked to exchange this information among applications and services. An integration framework can provide access to resources by integrating the resources with an application server. The portal framework and integration framework can be implemented on an application server which can support enterprise applications. This description is not intended to be a complete description of, or limit the scope of, the invention. Other features, aspects, and objects of the invention can be obtained from a review of the specification, the figures, and the claims.

29 Claims, 24 Drawing Sheets

U.S. PATENT DOCUMENTS

| | | | |
|---|---|---|---|
| 5,237,614 A | 8/1993 | Weiss | |
| 5,347,653 A | 9/1994 | Flynn et al. | |
| 5,355,474 A | 10/1994 | Thuraisngham et al. | |
| 5,369,702 A | 11/1994 | Shanton | 380/4 |
| 5,426,747 A | 6/1995 | Weinreb et al. | |
| 5,481,700 A | 1/1996 | Thuraisingham | 395/600 |
| 5,544,322 A | 8/1996 | Cheng et al. | |
| 5,557,747 A | 9/1996 | Rogers et al. | |
| 5,627,886 A | 5/1997 | Bowman | 379/111 |
| 5,757,669 A | 5/1998 | Christie et al. | |
| 5,797,128 A | 8/1998 | Birnbaum | 707/5 |
| 5,825,883 A | 10/1998 | Archibald et al. | |
| 5,826,000 A | 10/1998 | Hamilton | |
| 5,826,268 A | 10/1998 | Schaefer et al. | 707/9 |
| 5,848,396 A | 12/1998 | Gerace | 705/10 |
| 5,867,667 A | 2/1999 | Butman et al. | |
| 5,872,928 A | 2/1999 | Lewis et al. | |
| 5,889,953 A | 3/1999 | Thebaut et al. | |
| 5,918,210 A | 6/1999 | Rosenthal et al. | |
| 5,950,195 A | 9/1999 | Stockwell et al. | |
| 5,954,798 A | 9/1999 | Shelton et al. | |
| 5,956,400 A | 9/1999 | Chaum et al. | |
| 5,966,535 A | 10/1999 | Benedikt et al. | 395/707 |
| 5,966,707 A | 10/1999 | Van Huben et al. | |
| 5,987,469 A | 11/1999 | Lewis et al. | |
| 5,987,611 A | 11/1999 | Freund | |
| 5,991,877 A | 11/1999 | Luckenbaugh | 713/200 |
| 6,005,571 A | 12/1999 | Pachauri | 345/339 |
| 6,006,194 A | 12/1999 | Merel | |
| 6,029,144 A | 2/2000 | Barrett et al. | |
| 6,029,182 A | 2/2000 | Nehab et al. | 707/523 |
| 6,054,910 A | 4/2000 | Tada et al. | |
| 6,055,515 A | 4/2000 | Consentino et al. | |
| 6,055,637 A | 4/2000 | Hudson et al. | |
| 6,073,242 A | 6/2000 | Hardy et al. | |
| 6,083,276 A | 7/2000 | Davidson et al. | 717/1 |
| 6,098,173 A | 8/2000 | Elgressy et al. | |
| 6,108,687 A | 8/2000 | Craig | |
| 6,122,647 A | 9/2000 | Horowitz et al. | |
| 6,141,010 A | 10/2000 | Hoyle | 345/356 |
| 6,141,686 A | 10/2000 | Jackowski et al. | |
| 6,148,333 A | 11/2000 | Guedalia et al. | |
| 6,154,844 A | 11/2000 | Touboul et al. | |
| 6,157,924 A | 12/2000 | Austin | 707/10 |
| 6,158,010 A | 12/2000 | Moriconi et al. | |
| 6,167,407 A | 12/2000 | Nachenberg et al. | |
| 6,167,445 A | 12/2000 | Gai et al. | |
| 6,170,009 B1 | 1/2001 | Mandal et al. | |
| 6,182,226 B1 | 1/2001 | Reid et al. | 713/201 |
| 6,182,277 B1 | 1/2001 | DeGroot et al. | |
| 6,185,587 B1 | 2/2001 | Bernardo et al. | |
| 6,202,066 B1 | 3/2001 | Barkley et al. | |
| 6,202,157 B1 | 3/2001 | Brownlie et al. | |
| 6,202,207 B1 | 3/2001 | Donohue | |
| 6,209,101 B1 | 3/2001 | Mitchem et al. | |
| 6,216,231 B1 | 4/2001 | Stubblebine | |
| 6,226,745 B1 | 5/2001 | Wiederhold | 713/200 |
| 6,233,682 B1 | 5/2001 | Fritsch | 713/168 |
| 6,241,608 B1 | 6/2001 | Torango | 463/27 |
| 6,243,747 B1 | 6/2001 | Lewis et al. | |
| 6,253,321 B1 | 6/2001 | Nikander et al. | |
| 6,260,021 B1 | 7/2001 | Wong et al. | 705/2 |
| 6,260,050 B1 | 7/2001 | Yost et al. | 707/501 |
| 6,269,393 B1 | 7/2001 | Yost et al. | 709/201 |
| 6,269,456 B1 | 7/2001 | Hodges et al. | |
| 6,275,941 B1 | 8/2001 | Saito et al. | |
| 6,285,366 B1 | 9/2001 | Ng et al. | |
| 6,285,985 B1 | 9/2001 | Horstmann | 705/14 |
| 6,292,900 B1 | 9/2001 | Ngo et al. | |
| 6,295,607 B1 | 9/2001 | Johnson | |
| 6,301,613 B1 | 10/2001 | Ahlstrom et al. | |
| 6,308,163 B1 | 10/2001 | Du et al. | 705/8 |
| 6,317,868 B1 | 11/2001 | Grimm et al. | |
| 6,327,594 B1 | 12/2001 | Van Huben et al. | |
| 6,327,618 B1 | 12/2001 | Ahlstrom et al. | |
| 6,327,628 B1 | 12/2001 | Anuff et al. | 709/311 |
| 6,332,134 B1 | 12/2001 | Foster | 705/39 |
| 6,339,423 B1 | 1/2002 | Sampson et al. | |
| 6,339,826 B2 | 1/2002 | Hayes et al. | |
| 6,341,352 B1 | 1/2002 | Child et al. | |
| 6,353,886 B1 | 3/2002 | Howard et al. | |
| 6,360,363 B1 | 3/2002 | Moser et al. | |
| 6,377,973 B2 | 4/2002 | Gideon | |
| 6,378,075 B1 | 4/2002 | Goldstein et al. | 713/200 |
| 6,381,579 B1 | 4/2002 | Gervais et al. | |
| 6,385,627 B1 | 5/2002 | Cragun | |
| 6,393,474 B1 | 5/2002 | Eichert et al. | |
| 6,397,222 B1 | 5/2002 | Zellweger | |
| 6,397,231 B1 | 5/2002 | Salisbury et al. | |
| 6,412,070 B1 | 6/2002 | Van Dyke et al. | |
| 6,412,077 B1 | 6/2002 | Roden et al. | |
| 6,418,448 B1 | 7/2002 | Sarkar | |
| 6,430,556 B1 | 8/2002 | Goldberg et al. | |
| 6,457,007 B1 | 9/2002 | Kikuchi et al. | |
| 6,460,141 B1 | 10/2002 | Olden | 713/201 |
| 6,466,239 B2 | 10/2002 | Ishikawa | |
| 6,473,791 B1 | 10/2002 | Al-Ghosein et al. | |
| 6,476,828 B1 | 11/2002 | Burkett et al. | 345/760 |
| 6,477,543 B1 | 11/2002 | Huang et al. | |
| 6,477,575 B1 | 11/2002 | Koeppel et al. | |
| 6,484,177 B1 | 11/2002 | Van Huben et al. | |
| 6,484,261 B1 | 11/2002 | Wiegel | |
| 6,487,594 B1 | 11/2002 | Bahlmann | |
| 6,510,513 B1 | 1/2003 | Danieli | |
| 6,519,647 B1 | 2/2003 | Howard et al. | |
| 6,530,024 B1 | 3/2003 | Proctor | |
| 6,539,375 B2 | 3/2003 | Kawasaki | 707/5 |
| 6,542,908 B1 | 4/2003 | Ims | 707/204 |
| 6,553,410 B2 | 4/2003 | Kikinis | 709/218 |
| 6,571,247 B1 | 5/2003 | Danno et al. | 707/100 |
| 6,574,736 B1 | 6/2003 | Andrews | |
| 6,581,054 B1 | 6/2003 | Bogrett | |
| 6,581,071 B1 | 6/2003 | Gustman et al. | |
| 6,584,454 B1 | 6/2003 | Hummel et al. | |
| 6,587,849 B1 | 7/2003 | Mason et al. | 707/5 |
| 6,587,876 B1 | 7/2003 | Mahon et al. | |
| 6,615,218 B2 | 9/2003 | Mandal et al. | |
| 6,618,806 B1 | 9/2003 | Brown et al. | |
| 6,633,538 B1 | 10/2003 | Tanaka et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | 715/517 |
| 6,684,369 B1 | 1/2004 | Bernardo et al. | |
| 6,697,805 B1 | 2/2004 | Choquier et al. | |
| 6,721,888 B1 | 4/2004 | Liu et al. | |
| 6,732,144 B1 | 5/2004 | Kizu et al. | |
| 6,735,586 B2 | 5/2004 | Timmons | 707/3 |
| 6,735,701 B1 | 5/2004 | Jacobson | |
| 6,738,789 B2 | 5/2004 | Multer et al. | |
| 6,751,659 B1 | 6/2004 | Fenger et al. | |
| 6,754,672 B1 | 6/2004 | McLauchlin | 707/104 |
| 6,757,698 B2 | 6/2004 | McBride et al. | |
| 6,769,095 B1 | 7/2004 | Brassard et al. | |
| 6,769,118 B2 | 7/2004 | Garrison et al. | |
| 6,779,002 B1 | 8/2004 | Mwaura | |
| 6,789,202 B1 | 9/2004 | Ko et al. | |
| 6,856,999 B2 | 2/2005 | Flanagin et al. | |
| 6,857,012 B2 | 2/2005 | Sim et al. | |
| 6,865,549 B1 | 3/2005 | Connor | |
| 6,880,005 B1 | 4/2005 | Bell et al. | |
| 6,889,222 B1 | 5/2005 | Zhao | |
| 6,901,403 B1 | 5/2005 | Bata et al. | |
| 6,904,454 B2 | 6/2005 | Stickler | |
| 6,920,457 B2 | 7/2005 | Pressmar | |

| | | |
|---|---|---|
| 6,922,695 B2 | 7/2005 | Skufca et al. |
| 6,934,934 B1 | 8/2005 | Osborne, II et al. |
| 6,957,261 B2 | 10/2005 | Lortz |
| 6,961,897 B1 | 11/2005 | Peel et al. |
| 6,965,999 B2 | 11/2005 | Fox et al. |
| 6,970,876 B2 | 11/2005 | Hotti et al. |
| 6,978,379 B1 | 12/2005 | Goh et al. |
| 6,985,915 B2 | 1/2006 | Somalwar et al. |
| 6,988,138 B1 | 1/2006 | Alcorn et al. |
| 7,003,578 B2 | 2/2006 | Kanada et al. |
| 7,035,879 B2 | 4/2006 | Shi et al. |
| 7,035,944 B2* | 4/2006 | Fletcher et al. ............ 709/250 |
| 7,047,522 B1 | 5/2006 | Dixon et al. |
| 7,051,316 B2 | 5/2006 | Charisius et al. |
| 7,054,910 B1 | 5/2006 | Nordin et al. |
| 7,062,490 B2 | 6/2006 | Adya et al. |
| 7,062,511 B1 | 6/2006 | Poulsen |
| 7,080,000 B1 | 7/2006 | Cambridge |
| 7,085,755 B2 | 8/2006 | Bluhm et al. |
| 7,089,584 B1 | 8/2006 | Sharma |
| 7,093,200 B2 | 8/2006 | Schreiber et al. |
| 7,093,261 B1* | 8/2006 | Harper et al. ............... 719/310 |
| 7,093,283 B1 | 8/2006 | Chen et al. |
| 7,096,224 B2 | 8/2006 | Murthy et al. |
| 7,124,413 B1* | 10/2006 | Klemm et al. ............. 719/313 |
| 7,143,190 B2* | 11/2006 | Christensen et al. ........ 709/246 |
| 7,174,563 B1 | 2/2007 | Brownlie et al. |
| 7,185,192 B1 | 2/2007 | Kahn |
| 7,219,140 B2 | 5/2007 | Marl et al. |
| 2001/0032128 A1 | 10/2001 | Kepecs |
| 2001/0034771 A1 | 10/2001 | Hütsch et al. |
| 2001/0044810 A1 | 11/2001 | Timmons |
| 2001/0047485 A1 | 11/2001 | Brown et al. |
| 2002/0005867 A1 | 1/2002 | Gvily |
| 2002/0019827 A1 | 2/2002 | Shirman et al. |
| 2002/0029296 A1 | 3/2002 | Anuff et al. |
| 2002/0059394 A1 | 5/2002 | Sanders |
| 2002/0062451 A1 | 5/2002 | Scheidt et al. |
| 2002/0067370 A1 | 6/2002 | Forney et al. |
| 2002/0069261 A1 | 6/2002 | Bellare et al. |
| 2002/0087571 A1 | 7/2002 | Stapel et al. |
| 2002/0103818 A1 | 8/2002 | Amberden |
| 2002/0107913 A1 | 8/2002 | Rivera et al. |
| 2002/0112171 A1 | 8/2002 | Ginter et al. |
| 2002/0120685 A1 | 8/2002 | Srivastava et al. |
| 2002/0120787 A1 | 8/2002 | Shapiro et al. |
| 2002/0123957 A1* | 9/2002 | Notarius et al. ............... 705/37 |
| 2002/0135617 A1 | 9/2002 | Yaron |
| 2002/0143819 A1 | 10/2002 | Han et al. |
| 2002/0147645 A1 | 10/2002 | Alao et al. |
| 2002/0147696 A1 | 10/2002 | Acker et al. |
| 2002/0152267 A1 | 10/2002 | Lennon |
| 2002/0152279 A1 | 10/2002 | Sollenberger et al. |
| 2002/0161903 A1 | 10/2002 | Besaw |
| 2002/0169893 A1 | 11/2002 | Chen et al. |
| 2002/0173971 A1 | 11/2002 | Stirpe et al. |
| 2002/0178119 A1 | 11/2002 | Griffin et al. |
| 2002/0188869 A1 | 12/2002 | Patrick |
| 2002/0194267 A1 | 12/2002 | Flesner et al. |
| 2003/0014442 A1 | 1/2003 | Shiigi et al. |
| 2003/0018510 A1* | 1/2003 | Sanches .................... 705/9 |
| 2003/0018832 A1 | 1/2003 | Amirisetty et al. |
| 2003/0032409 A1 | 2/2003 | Hutcheson et al. |
| 2003/0046576 A1 | 3/2003 | High et al. |
| 2003/0061102 A1 | 3/2003 | Menninger et al. |
| 2003/0088617 A1* | 5/2003 | Clark et al. ............... 709/203 |
| 2003/0110448 A1 | 6/2003 | Haut et al. |
| 2003/0120686 A1 | 6/2003 | Kim et al. |
| 2003/0126464 A1 | 7/2003 | McDaniel et al. |
| 2003/0126558 A1 | 7/2003 | Griffin |
| 2003/0131113 A1 | 7/2003 | Reeves et al. |
| 2003/0135490 A1 | 7/2003 | Barrett et al. |
| 2003/0146937 A1 | 8/2003 | Lee |
| 2003/0163544 A1 | 8/2003 | Wookey et al. |
| 2003/0167315 A1 | 9/2003 | Chowdhry et al. |
| 2003/0167455 A1 | 9/2003 | Iborra et al. |
| 2003/0187763 A1* | 10/2003 | Jordan et al. ................... 705/35 |
| 2003/0200350 A1 | 10/2003 | Kumar et al. |
| 2003/0204481 A1 | 10/2003 | Lau |
| 2003/0212766 A1 | 11/2003 | Giles et al. |
| 2003/0216938 A1 | 11/2003 | Shour |
| 2003/0220913 A1 | 11/2003 | Doganata et al. |
| 2003/0220963 A1 | 11/2003 | Golovinsky et al. |
| 2003/0229623 A1 | 12/2003 | Chang et al. |
| 2004/0015366 A1* | 1/2004 | Wiseman et al. ............... 705/1 |
| 2004/0024812 A1 | 2/2004 | Park et al. |
| 2004/0030744 A1 | 2/2004 | Rubin et al. |
| 2004/0030795 A1 | 2/2004 | Hesmer et al. |
| 2004/0078371 A1 | 4/2004 | Worrall et al. |
| 2004/0098467 A1 | 5/2004 | Dewey et al. |
| 2004/0167880 A1 | 8/2004 | Smith |
| 2004/0167899 A1 | 8/2004 | Patadia et al. |
| 2004/0205473 A1 | 10/2004 | Fisher et al. |
| 2004/0205557 A1 | 10/2004 | Bahrs et al. |
| 2004/0215650 A1 | 10/2004 | Shaji et al. |
| 2004/0230546 A1 | 11/2004 | Rogers |
| 2004/0243824 A1 | 12/2004 | Jones |
| 2005/0021502 A1 | 1/2005 | Chen et al. |
| 2005/0050184 A1 | 3/2005 | Boden et al. |
| 2005/0060324 A1 | 3/2005 | Johnson et al. |
| 2005/0086206 A1 | 4/2005 | Balasubramanian et al. |
| 2005/0097008 A1 | 5/2005 | Ehring et al. |
| 2005/0198617 A1 | 9/2005 | Kim et al. |
| 2006/0059107 A1* | 3/2006 | Elmore et al. ................... 705/64 |
| 2006/0085412 A1 | 4/2006 | Johnson et al. |
| 2006/0122882 A1 | 6/2006 | Brown et al. |
| 2007/0083484 A1 | 4/2007 | McVeigh et al. |

FOREIGN PATENT DOCUMENTS

| | | |
|---|---|---|
| WO | WO0114962 A1 | 6/2000 |
| WO | WO0114962 A1 | 8/2000 |
| WO | WO 01/67285 A | 9/2001 |

OTHER PUBLICATIONS

"BEA WebLogic Integration™, Designing BEA WebLogic Intergration Solutions," Version 2.1, Oct. 2001, BEA Systems, Inc., pp. i-xii, 1-1 through 3-34, and 1-1 through 1-4.

"BEA WebLogic Integration™, Designing BEA WebLogic Integration Solutions," Release 2.1, Service Pack 1, Jan. 2002, BEA Systems, Inc., pp. i-xii, 1-1 through 3-34, and 1-1 through 1-4.

"BEA WebLogic Integration™, Learning to Use BEA WebLogic Integration," Version 2.1, Oct. 2001, BEA Systems, Inc., i-x, 1-1 through 3-86, and A-1 through A-6.

"BEA WebLogic Integration™, Learning to Use BEA WebLogic Integration," Release 2.1, Service Pack 1, Jan, 2002, BEA Systems, Inc., i-xii, 1-1 through 3-86, and A1-A6.

"BEA WebLogic Integration™, Using EDI with WebLogic Integration," Version 2.1, Oct. 2001, revised Nov. 2, 2001, BEA Systems, Inc., pp. i-xii, and 1-1 through 7-8.

"BEA WebLogic Integration™, Using EDI with WebLogic Integration," Release 2.1, ServicePack 1, Jan. 2002, BEA Systems, Inc., pp. i-xii, and 1-1 through 7-8.

"Using the Web Service Portlet Wizard," BEA Systems, Inc., 2001, pp. 1-16.

"Using the Web Service Portlet Wizard With Weblogic Portal™ 4.0," BEA Systems, Inc., 2001, pp. 1-15.

"Java™2 Platform, Enterprise Edition—Overview, Application Model," java.sun.com/j2ee/overview2, pp. 1-3, printed on Apr. 30, 2002.

"Java™2 Platform, Enterprise Edition—Overview, Setting the Standard," java.sun.com/j2ee/overview2, pp. 1-3, printed on Apr. 30, 2002.

"Java™2 Platform, Enterprise Edition—Overview, Introduction," java.sun.com/j2ee/overview2, pp. 1-3, printed on Oct. 9, 2003.

"Explore the Dynamic Proxy API", JavaWorld, Nov. 2000, pp. 1-14.

Sundsted, Todd, "JNDI Overview, Part 1: An Introduction to Naming Services"; JavaWorld; Jan. 2000, pp. 1-6; downloaded from: www/javaworld.com/javaworld/jw-01-howto_p.html).

Moore, Bill, et al.; "Migrating Weblogic Applications to WebSphere Advanced Edition"; IBM Redbooks, Jan. 2001; pp. 1.3-4, 109-111 and 181-195.

Barrett, Alexandra; "Trying Out Transactions"; SunExpert Magazine, Jan. 1999, pp. 57-59.

Ayers, Danny, et al.; Professional Java Server Programming, Wrox Press, Ltd., Birmingham, UK. Dec. 1999, pp. 515-545.

Ford, Nigle; Web Developer.com Guide to Building Intelligent Web Sites with JavaScript, Wiley Computer Publishing, New York, NY; © 1998, pp. 65-86, 101-102, 245-250 and 324-327.

Microsoft Computer Dictionary, 4th Edition, Microsoft Press, Redmond, WA © 1999, p. 489.

Eiji Okamoto, "Proposal for Integrated Security Systems"; Jun. 1992, IEEE Computer Society Press; pp. 354-358.

"J2EE Enterprise Java Beans Technology"; http://java.sun.com/products/ejb; 2 pages (last visit: Dec. 7, 2004).

"To EJB, or not to EJB"; http://www.javaworld.com/javaworld/jw-12-2001/jw-1207-yesnoejb_p.html (last visit: Dec. 7, 2004).

"USDataCenter Chooses Baltimore SelectAccess to Enable Next generation Security Solutions for eBusiness"; Business Wire, P2079, Apr. 4, 2001; Newswire; Trade; pp. 2.

C.W. Symborski, "Updating Software and Configuration Data in a Distributed Communications Network"; Computer Networking Symposium, 1988; pp. 331-338.

Gediminas Adomavicius, et al., "User Profiling in Personalization Applications Through Rule Discovery and Validation", KDD '99, San Diego CA © 1999, pp. 377-381.

Ibrahim Cingil, et al., "A Broader Approach to Personalization"; Communications for the ACM, vol. 43, No. 6, Aug. 2000; pp. 136-141.

Constantine Stephanidis, et al., "Decision Making in Intelligent User Interfaces", IUI '97, Orlando, FL, © 1997, pp. 195-202.

Oliver Stiemerling, et al., "How to Make Software Softer—Designing Tailorable Applications", DIS '97, Amsterdam, The Netherlands, © 1997, pp. 365-376.

Freudenthal et al., "dRBAC: Distributed Role-based Access Control for Dynamic Coalition Environments", Proceedings of the 22nd International Conference on Distributed Computing Systems (ICDCS '02), IEEE 2000, 10 pages.

Zhang et al., "Designing a Robust Namespace for Distributed File Services", Reliable Distributed System, 2001. Proceedings, 20th IEEE Symposium on Oct. 28-31, 2001, pp. 162-171.

Adya et al., "Farsite: Federated, Available and Reliable Storage for an Incompletely Trusted Environment", ACM SIGOPS Operating Systems Review, vol. 36, Issue SI (Winter 2002). OSDI '02: Proceedings of the 5th Symposium on Operating Systems and Implementation. pp. 1-14.

T. Kistler et al., "WebL- A Programming Language for the Web"; Computer Networks and ISDN Systems, North Holland Publishing, Amsterdam, NL; vol. 30, No. 1-7; Apr. 1998; pp. 259-270.

M. R. Levy, "Web Programming in Guide"; Software Practices & Experience, Wiley and Sons; Bognor Regis, GB; vol. 28, No. 15; Dec. 25, 1998; pp. 1581-1603.

D.L. Atkins et al., "MAWL: A Domain-specific Language for Form-based Services"; IEEE Transactions on Software Engineering; IEEE Service Center, Los Almitos, CA, US; vol. 25, No. 3, May 1999; pp. 334-346.

T. Howes, "The String Representation of LDAP Search Filters"; Dec. 1997 (RFC 2254); pp. 1-8.

Supplementary European Search Report; Application No. 01975484.5; dated Dec. 12, 2006; Receviced Jan. 10, 2007; 2 pages.

Browne, et al., "Location-Independent Naming for Virtual Distributed Software Repositories", http://portal.acm.org/dl.cfm, ACM Symposium on Software Reusability, Seattle, WA, US, Aug. 1995, vol. 20, Issue SI, pp. 179-185.

Candan, K.S., et al., "Enabling Dynamic Content Caching for Database-Driven Web Sites", Proceedings of the 2001 ACM SIGMOD International Conference on Management of Data, Santa Barbara, California, USA, May 21-24, 2001, pp. 532-543 (2001).

Catley, Christina, et al., "Design of a Health Care Architecture for Medical Data Interoperability and Application Integration", Proceedings of the Second Join EMBS/BMES Conference, Houston TX, USA, Oct. 23-26, 2002, IEEE, vol. 3, pp. 1952-1953 (2002).

Parker, The Complete Idiot's Guide to Microsoft FrontPage 2000, May 1999, 1-2, 7, 52, Que, USA.

Rossi, et al., "Designing Personalized Web Applications", May 1-5, 2001, pp. 275-284, WWW 10, Hong Kong, ACM.

Tanyi, "Easy XML", Mar. 6, 2000, pp. 1-6, www.winsite.com.

IBM, "Method and System for Visually Constructing Document Type Definitions and Related Artifacts Using a Reuseable Object Model", Technical Disclosure, May 23, 2001, 3 pages, IP.com.

Lee, et al., "Keeping Virtual Information Resources Up and Running", Nov. 1997, pp. 1-14, IBM Press.

Parker, "The Complete Idiots Guide to Microsoft FrontPage 2000", 1999, pp. 7 and 55, QUE.

Goh, "Toards a More Complete Model of Role", Symposium on Access Control Models and Technologies, Proceedings of the third ACM workshop on Role-Based Access Control, 7 pages, 1998.

Tzelepi, et al., "A Flexible Content and Context-Based Access Control Model for Multimedia Medical Image Database Systems", International Multimedia Conference, Proceedings of the 2001 workshop on Multimedia and security: new challenges, 4 pages, 2001.

Hayton, et al. "Access Control in an Open Distributed Environment", 12 pages, 1998.

Bertino et al., "TRBAC: A Temporal Role-Based Access Control Model", ACM Transactions on Information and System Security, Aug. 2001, pp. 191-223, vol. 4, No. 3.

Sandhu, et al., "Role-Based Access Control Models", IEEE Computer, Feb. 1996, pp. 38-47, vol. 29, No. 2.

Covington, et al., "Securing Context-Aware Applications Using Environment Roles", ACM workshop on Role Based Access Control, Proceedings of the Sixth ACM Symposium on Access Control Models and Technologies, 11 pages, 2001.

Yao, et al., "A Model for OASIS Role-Based Access Control and its Support for Active Security", ACM workshop on Role Based Access Control, Proceedings of the Sixth ACM Symposium on Access Control Models and Technologies, 11 pages, 2001.

Georgiadis, et al., "Flexible Team-Based Access Control Using Contexts", ACM workshop on Role Based Access Control, Proceedings of the Sixth ACM Symposium on Access Control Models and Technologies, 7 pages, 2001.

\* cited by examiner

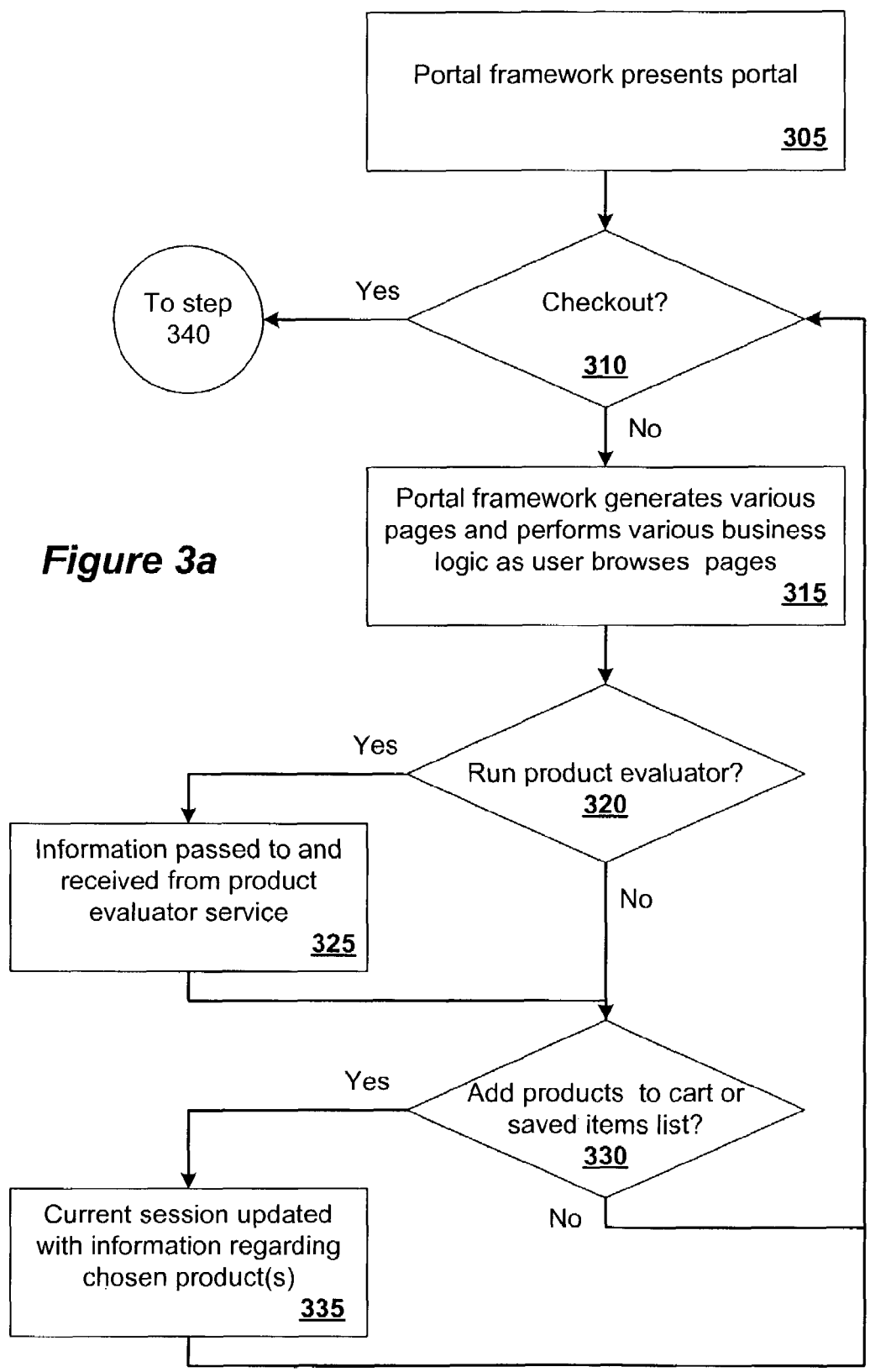

ENTERPRISE APPLICATION PLATFORM

CLAIM OF PRIORITY

This application claims priority to U.S. Provisional Patent Application No. 60/376,913, entitled "WEB SERVICE ENABLED PORTALS AND BUSINESS PLATFORM," filed May 1, 2002, which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/377,917, entitled "WEB SERVICE-ENABLED PORTLET WIZARD," filed Feb. 28, 2003; and U.S. patent application Ser. No.10/377,865, entitled "PORTAL SETUP WIZARD," filed Feb. 28, 2003.

FIELD OF THE INVENTION

The invention relates generally to platforms for running and integrating software applications, such as enterprise applications.

BACKGROUND

Electronic commerce has established itself as a lasting and important component in the modern economy. For continued and long-term success, electronic commerce will require cross-enterprise collaborations among disparate resources including enterprise applications. To achieve cross-enterprise integration, a company must first integrate internal applications. To date, an integration solution that is easy to use, affordable, and based on industry wide standards has not been successfully established. No solution achieving an industry standard infrastrucutre with universal connectivity, massive scalability, and incorporating accessible business process tools has been developed.

Many companies have a need for platform solutions capable of fully integrating internal business processes that include multiple internal applications. These same companies also have a need for platform solutions capable of integrating internal applications with external services and applications including external business-to-consumer and business-to-business applications, such as applications that can utilize the Internet to generate revenue and reduce costs. The requirement for Internet-enabled applications has led to the rise of the application server market. To date, application servers have primarily been used to host external applications targeted at customers and partners. Application servers are themselves packaged applications that, instead of solving a specific problem, are general-purpose platforms that host vertical solutions.

Furthermore, many companies need an efficient solution for providing targeted presentations to consumers, partners, and employees in the form of user friendly interfaces. Integrating these interfaces with existing and future internal and external applications can further complicate attempts at successful, efficient, and reliable fully integrated business solutions.

BRIEF SUMMARY

Systems and methods in accordance with one embodiment of the present invention can provide platform solutions to integrated business environments. A portal framework can be used to render portals including graphical user interfaces for displaying and receiving content. Information received and displayed by the portal framework can be exchanged with internal and external services and applications using standards-based transport protocols, messaging systems, and document types. An integration framework can be invoked to exchange this information among applications and services. A portal framework and integration framework can be implemented on an application server which can support enterprise applications running on single or multiple instances of the server. Communication among a portal framework and integration framework can further be accomplished by utilizing standards-based communication.

Other features, aspects, and objects of the invention can be obtained from a review of the specification, the figures, and the claims.

BRIEF DESCRIPTION OF THE DRAWINGS

The present invention will described by way of exemplary embodiments, but not limitations, illustrated by the accompanying drawings wherein like references indicate similar elements, and wherein:

FIGS. 3a-3e are flowcharts illustrating the interaction of the various software components of FIG. 2 that can be used to implement the enterprise application;

FIGS. 4a-4g are screenshots illustrating a portal and various portal pages that can be generated in accordance with the enterprise application implemented by the components of FIG. 2 and of FIGS. 3a-3e.

FIGS. 7a-7f are screenshots illustrating a portal and various portal pages that can be generated in accordance with the enterprise application implemented by the components of FIG. 5 and method of FIGS. 6a-6c.

DETAILED DESCRIPTION

Figure 1:
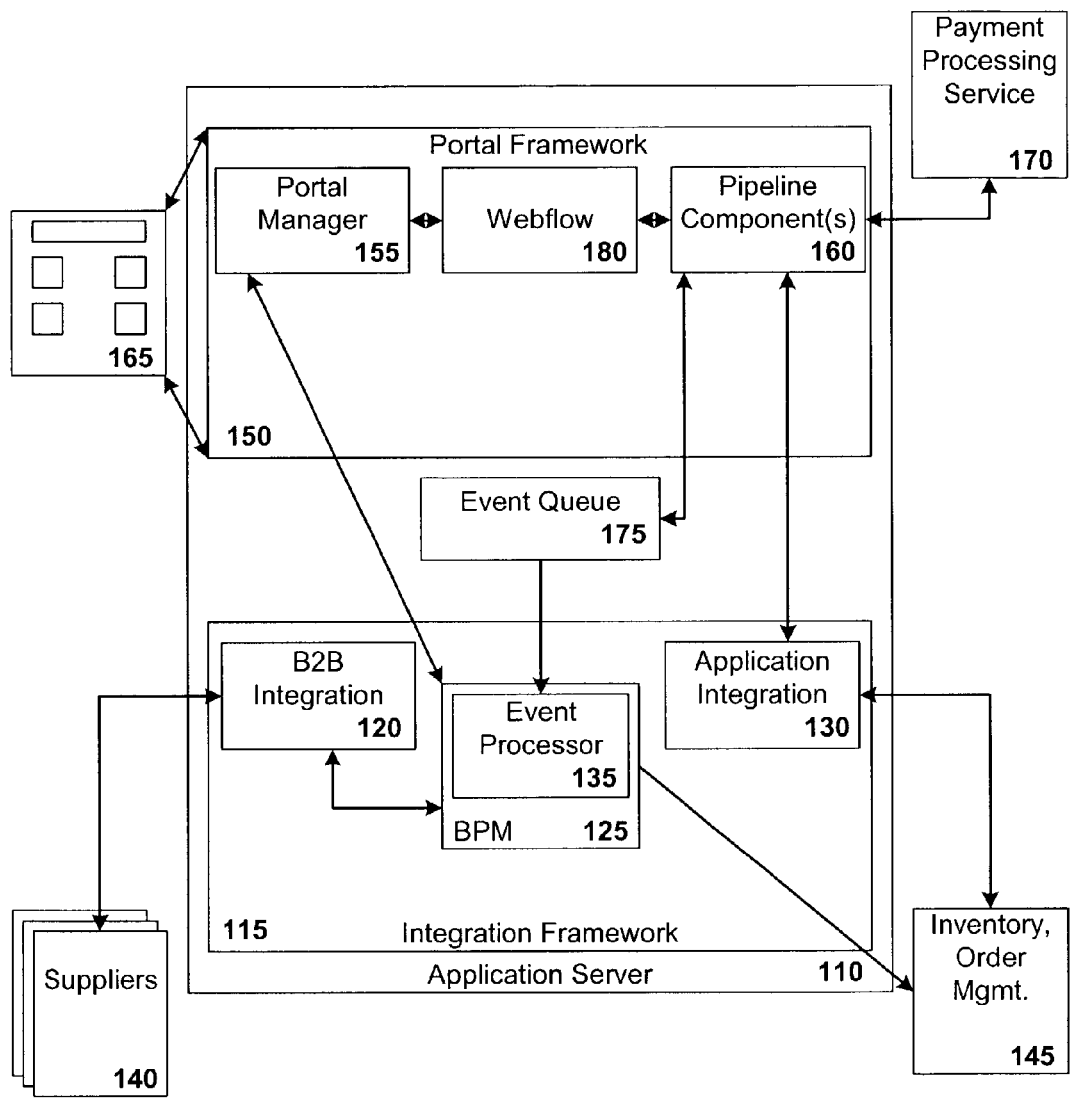
FIG. 1 is a high level block diagram of various software components of a computer network capable of supporting a configurable electronic business system in accordance with an embodiment of the present invention.

FIG. 1 is a high level block diagram of various software components of a computer network supporting a configurable electronic business system in accordance with the present invention.

Application server 110 is an application server, such as BEA WEBLOGIC SERVER™ available from BEA Systems, Inc. of San Jose, Calif. Application server 110 can provide an easy to use application infrastructure for building, integrating, securing, and managing distributed applications including Java based applications. In one embodiment, application server 110 implements Java 2 Platform, Enterprise Edition (J2EE), available from Sun Microsystems, Inc. of Santa Clara, Calif.

Integration framework 115 can be implemented on application server 110 and can include various integrated components and/or software elements such as business-to-business (B2B) integration 120, a management component such as business process management (BPM) 125, and application integration 130. An event processor such as event processor 135 can be included within business process management 125. In various embodiments, B2B integration 120 can communicate with external components such as a computer network of a supplier 140. Other components, such as business process management 125 and application integration 130, can communicate with external components such as inventory or order management system 145. It will be appreciated that integration framework can communicate with a variety of resources such as internal and external applications, legacy systems, and databases, etc.

Application integration can utilize resource adapters and application views to establish an enterprise-wide, united framework for integrating any current or future application. Adapters can simplify integration efforts by allowing each application to be integrated with an application server, instead of requiring that each application be integrated with every other application.

The development and widespread acceptance of standards such as the J2EE standard, as well as the eXtensible Markup Language (XML), has laid the groundwork for a standardized approach to the development of these adapters. Perhaps the most significant of these standards for application integration is the J2EE Connector architecture. The J2EE Connector architecture (JCA) provides a standardized approach for the development of adapters for all types of applications, from legacy mainframe applications, such as CICS from IBM, to packaged applications such as PeopleSoft, Siebel, and SAP. The adoption of such standards enables businesses to develop adapters that work on any J2EE-compliant application server, for example.

An application integration component directed at enterprise application integration can have several primary aspects. If the functionality of an Enterprise Information System such as a PeopleSoft system or an SAP system is to be invoked, an implementation of the J2EE Connector Architecture can be used. If something occurs inside an EIS system, such as a trigger going off, an event can be generated. This event may, in some embodiments, need to be communicated to an external application. An event architecture in an application integration component can handle this communication.

An application view is an example of a component that can be used to simplify the way in which adapters are accessed. Application views can provide a layer of abstraction, for example, between an adapter and the EIS functions exposed by that adapter. Instead of accessing an EIS by direct programming a user can simply edit an adapter's application views, create new application views, or delete any obsolete application view(s). A more detailed discussion of an integration framework can be found in U.S. Patent application Ser. No. 10/271,194, entitled "APPLICATION VIEW COMPONENT FOR SYSTEM INTEGRATION," by Mitch Upton, filed Oct. 15, 2002, which application claims priority to U.S. Provisional Patent Application No. 60/347,919, filed Oct. 18, 2001, entitled "APPLICATION VIEW," as well as Application Ser. No. 60/347,901, entitled "EVENT ADAPTER," filed Oct. 8, 2001, all of which are hereby incorporated herein by reference.

Portal framework 150 can be implemented on application server 110 and can include various components such as portal manager 155, webflow 180, and pipeline component(s) 160. Portal manager 155 can manage the content generated within portal framework 150, including content generated by portal processors and portlet servlets (not shown) within framework 150 used in rendering various graphical user interfaces such as portal 165.

Portal framework 150 can render portals that can provide access to information networks and/or sets of services through the World Wide Web and/or other computer networks. Portals can provide a single point of access to data and applications, making portals valuable to developers, businesses, and consumers alike. A portal can present a unified and personalized view of enterprise information to employees, customers, and business partners. In many implementations, a portal application can include a Web application designed as a portal.

Portals are capable of presenting multiple web applications within a single web interface. In addition to regular web content that can appear in a portal, portals provide the ability to display portlets (self-contained applications or content) in a single web interface. Portals can also support multiple pages with tag-based navigation for accessing individualized content and portlets for each page.

Portlets can be implemented as Java server pages (JSPs) with XML-based metadata that can fit into a portal. Portlets can utilize various types of display code to display highly focused information directed to a specific user or user group, having a portal as the portlet's container. Portlets can include portlet components having portlet attributes (i.e. whether the portlet is editable, floatable, minimizable, maximizable, helpable, mandatory, has defaults minimized, or whether login is required) and portlet layout elements or components (i.e. banner, header, content, and footer sections). In one embodiment, a portlet is defined by a file that contains XML-based metadata for a portlet. Portlets can also be associated with portlet resource files including stub JSPs (one for each portlet layout element) and image files created and saved to a local file system. In various embodiments, portlet servlets within portal framework can generate and render content including JSPs to form the portlets within portal 165.

A webflow, such as webflow 180, can be used to control the flow of a user's session through the pages displayed in a browser, such as the pages associated with portal 165, as well as the execution of specific pieces of business logic. Webflow 180 can guide the progress of the interaction of the user with an actual e-commerce application system. Different types of application code can be used to track and to modify the user interface. These codes may in one embodiment include Java Servlet Pages (JSP) to present information to the user that includes a series of buttons, links and HTML elements; input processing code which is used to modify the user input; and pipeline processing code, which may be a stateless session Enterprise Java Bean (EJB) or manipulating entity EJB. An entry for each code type can be included in a property file used to configure the webflow. The property file describes the various states of the JSP, HTML, and input and pipeline processing features, and also describes the transitions between those features. The transitions may include links, buttons and processing results which determine how the output of one feature affects another feature.

Various events can be generated as a user navigates within or through portal 165. For example, selecting a particular content location using a mouse with an associated cursor located over the desired location can generate an event to be processed by webflow 180 and its associated components. Events can result in the invocation of input processors and pipelines including flexible mechanisms for handling form submission. Input processors can perform validation of data entered into pages and portlets and store the user data in various pipeline sessions for subsequent use by a pipeline component. A pipeline can include a storage location for information regarding the current session, such as data for the current shopping cart or transient data such as error messages relating to user input.

Pipeline component(s) 160 includes discrete units of server-side business logic for performing various tasks such as calculating tax, submitting orders for business transactions, or otherwise communicating with other components including service provider interfaces (SPI) implemented as EJB's. Input processors and pipelines (including pipeline components) can succeed and generate exceptions, from which webflow 180 can decide which pages to display and which pieces of business logic to execute. In one embodiment, pipeline component(s) 160 is included within webflow 180. A more detailed discussion of a portal framework including various components such as webflow can be found in U.S. patent application Ser. No. 09/908,023, entitled "SYSTEM FOR MANAGING LOGICAL PROCESS FLOW IN AN ONLINE ENVIRONMENT," by Neil Smithline and Sathyanarayana Giridhar, filed Jul. 18, 2001, which application claims priority to U.S. Provisional Patent Application No. 60/236,898, entitled "SYSTEM FOR MANAGING LOGICAL PROCESS FLOW IN AN ONLINE ENVIRONMENT," filed Sep. 28, 2000, each of which are hereby incorporated herein by reference.

In accordance with one embodiment of the present invention, portal framework 150 and integration framework 115 are implemented on a single instance of application server 110 and can run on a single Java virtual machine. Thus, portal framework 150 and integration framework 115 can be used together in an enterprise application running on a single instance of application server 110. In other embodiments, an enterprise application can run on multiple instances of application server 110, invoking functionality from various locations. In such embodiments, portal framework 150 and integration framework 115 may be implemented on separate servers or separate instances of the server. Portal framework 150 and integration framework 115 can communicate or otherwise exchange data and information using various standardized messaging systems. In one embodiment, portal framework 150 and integration framework 115 can exchange information using Java enabled messaging systems and standardized languages such as XML. For example, the J2EE connector Architecture and Java Messaging Service (JMS) can be used in some embodiments.

JMS, a Java API, is an enterprise messaging system allowing applications and components to communicate with one another through the exchange of messages that can include requests, reports, and events that contain information needed to coordinate communication between different applications and/or software components. Messages can provide a layer of abstraction allowing the details of a destination system and application code to be separated. JMS messaging systems can be used in enterprise applications to communicate with legacy systems or to provide communication lanes between business components running in different environments or on different hosts. The Java connector architecture can provide for connectivity between application servers and enterprise information systems such as ERP systems, mainframe transaction processing systems, and legacy database systems. The connector architecture can rely on technologies standardized and defined by the J2EE to avoid adding custom code when providing connectivity to an information system.

Portal framework 150 and integration framework 115, provided on application server 110, can simplify and ease the creation and implementation of enterprise applications for application developers.

Business-to-Consumer

Figure 2:
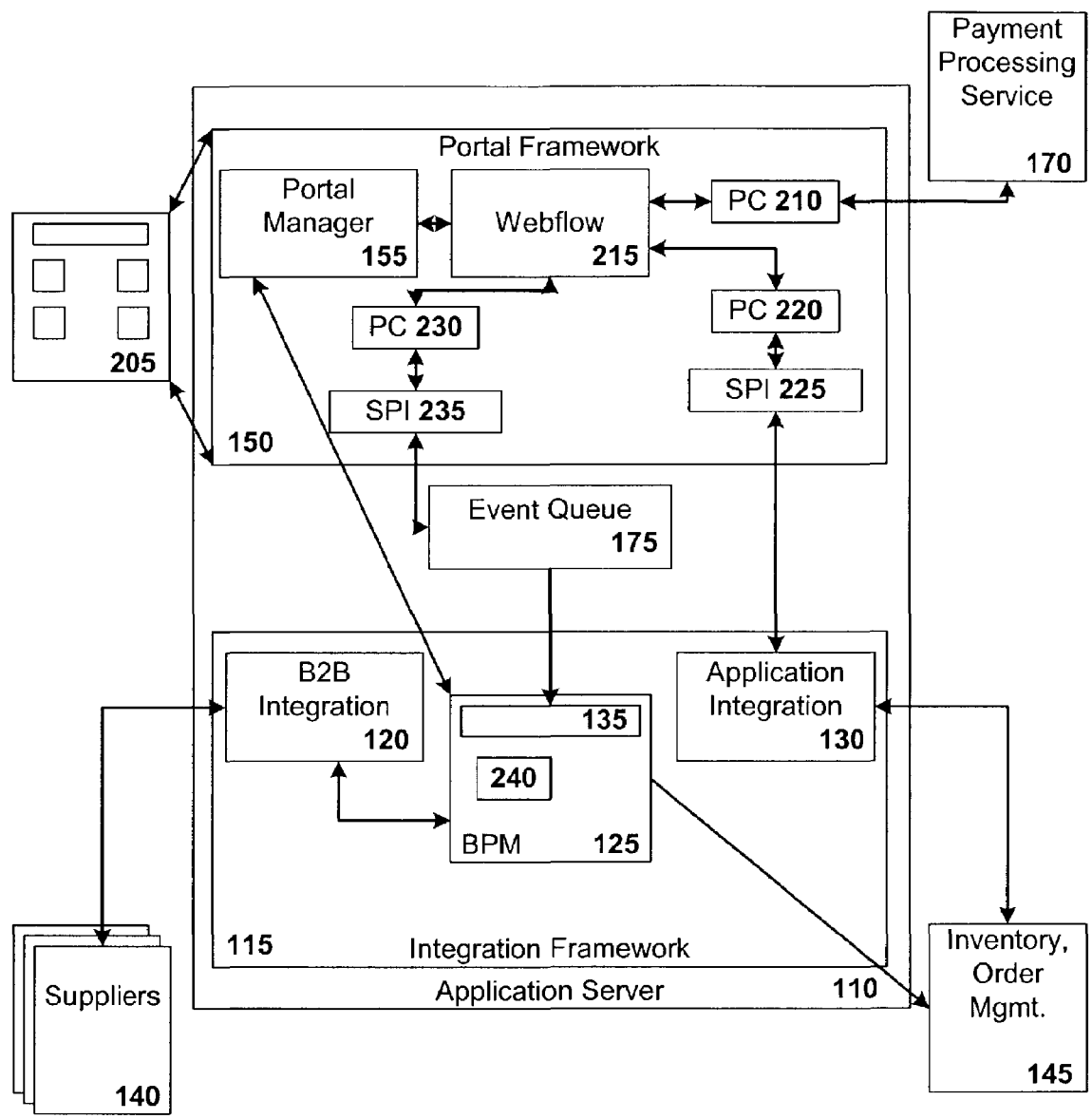
FIG. 2 is a high level block diagram of various software components of a computer network supporting a configurable electronic business system in accordance with an embodiment of the present invention that can be used to implement an enterprise application.

FIG. 2 is a high level block diagram of various software components of a computer network supporting a configurable electronic business system in accordance with one embodiment of the present invention that can be used to implement the following enterprise application. FIG. 3 is a flowchart illustrating the interaction of the various software components of FIG. 2 that can be used to implement the enterprise application.

Figure 4A:
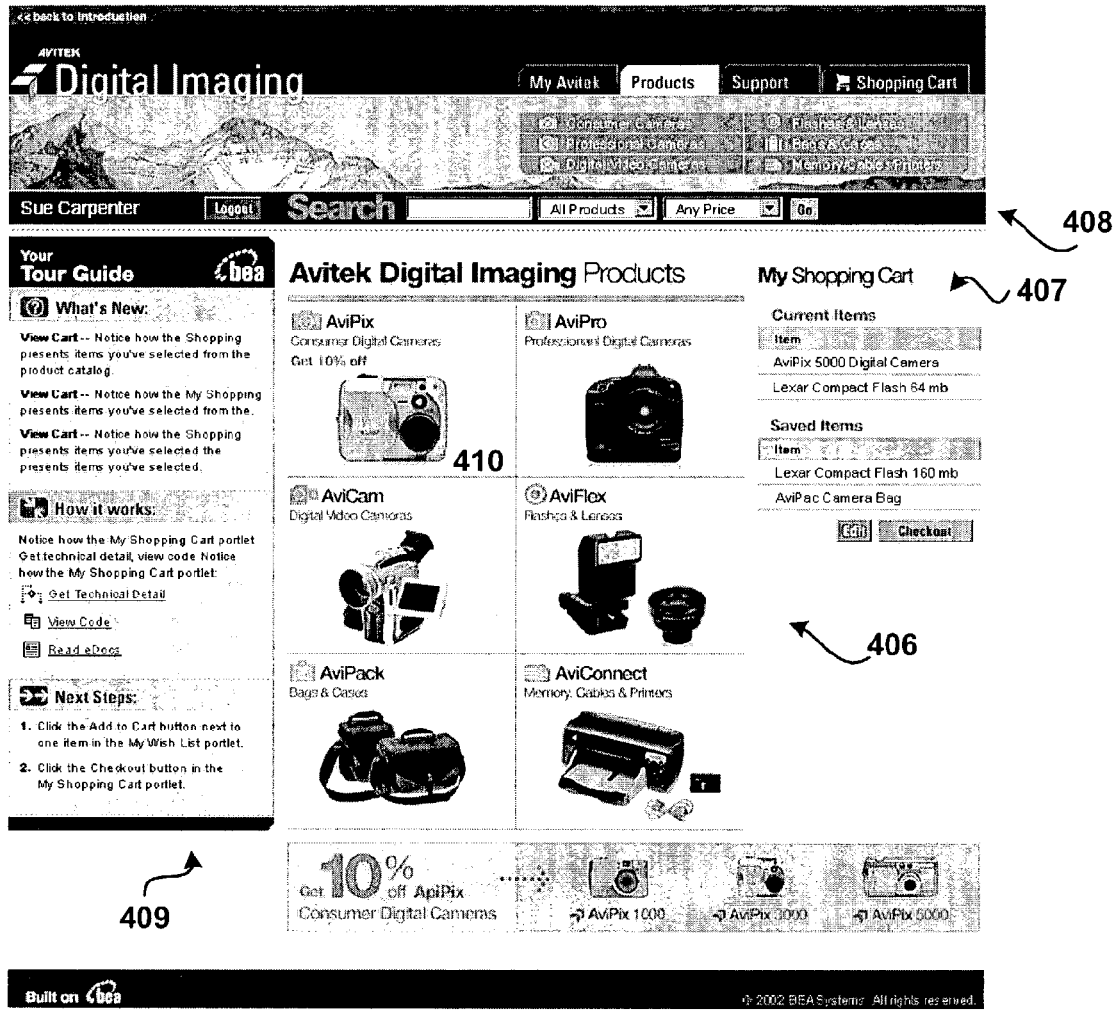

Portal framework 150 can present portal 205 to a user at a step 305. Portal 205 can present a personalized view to the user after the user logs in or is automatically logged in. In one embodiment, the personalized view is a default view. Portal manager 155, along with various webflow 215 and pipeline components (210,220,230), can render portal 205 substantially as shown in FIG. 4a, including multiple portlets such as browse catalog portlet 406, shopping cart portlet 407 (if user has placed items into the shopping cart), search portlet 408, and tour guide documentation portlet 409.

Figure 4B:
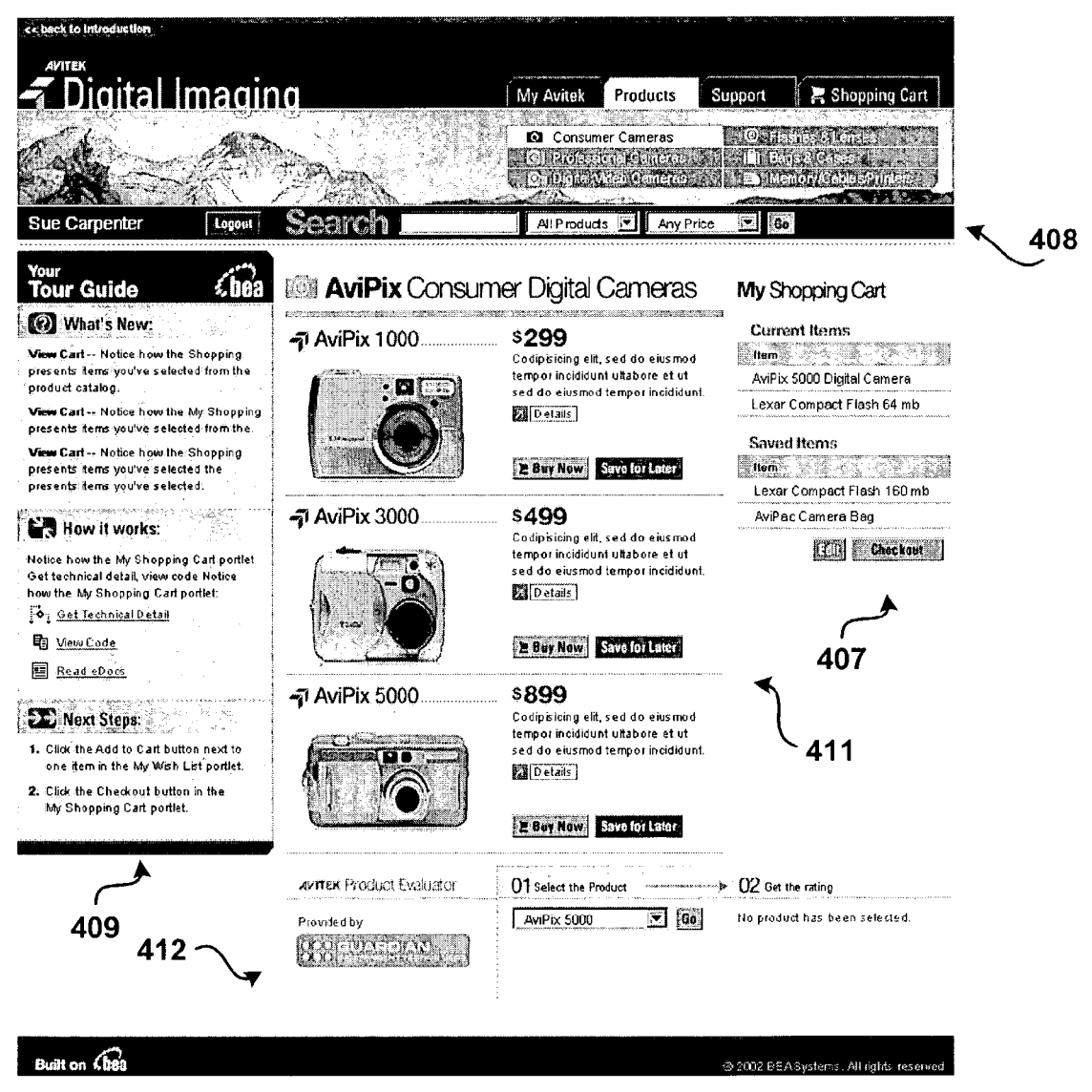

From shopping cart portlet 407 within portal 205 or the shopping cart page 416 (FIG. 4d) of portal 205, the user can select the checkout feature at step 310. If the checkout feature is not chosen, the user can search and/or browse the product catalog represented in the pages of portal 205 at step 315. For example, having selected the consumer digital cameras link 410, the user is presented with a category summary page for the consumer digital cameras. An event generated by the user selecting link 410 can generate an exception from which webflow 215 determines to display the category summary page, as illustrated in FIG. 4b. Portal manager 150 can gather the necessary resources, including any XML definition files and JSP pages to render the appropriate page. The category summary page, as shown in FIG. 4B, includes a search portlet 408, category portlet 411, shopping cart portlet 407, tour guide documentation portlet 409, and product evaluator portlet 412.

Figure 4C:

Product evaluator portlet 412 can be, for example, a web service enabled portlet adapted to expose an external rating web service for the items listed on the category summary page. Portlet 412, as described, can include JSP portlet code providing an HTML form for entering product numbers. If the user accesses the product evaluation portlet at step 320, information entered into the HTML form can be passed to an operation of the external web service which returns a rating for the product that can displayed in the portlet at step 325. In one embodiment, a pipeline component is invoked to pass the rating request and receive the response using, for example, the Simple Object Access Protocol (SOAP), which uses a combination of XML-based data structuring and the Hyper Text Transfer Protocol (HTTP) to define a standardized method for invoking methods in objects that are distributed in diverse operating environments across the Internet. FIGS. 4b and 4c illustrate product evaluator portlet 412 before and after a rating has been requested.

Figure 4D:

From various pages within portal 205, the user can add items to the shopping cart or to a saved list of items at step 330. As items are added to the shopping cart or saved list, the pipeline session for the current session can be updated with information regarding the chosen products at step 335. Additionally, from many of the pages within portal 205, the user can select a buy now feature for an item. In response, the item can be added to the shopping cart and portal framework 150 can present a shopping cart page as illustrated in FIG. 4d.

Figure 3B:
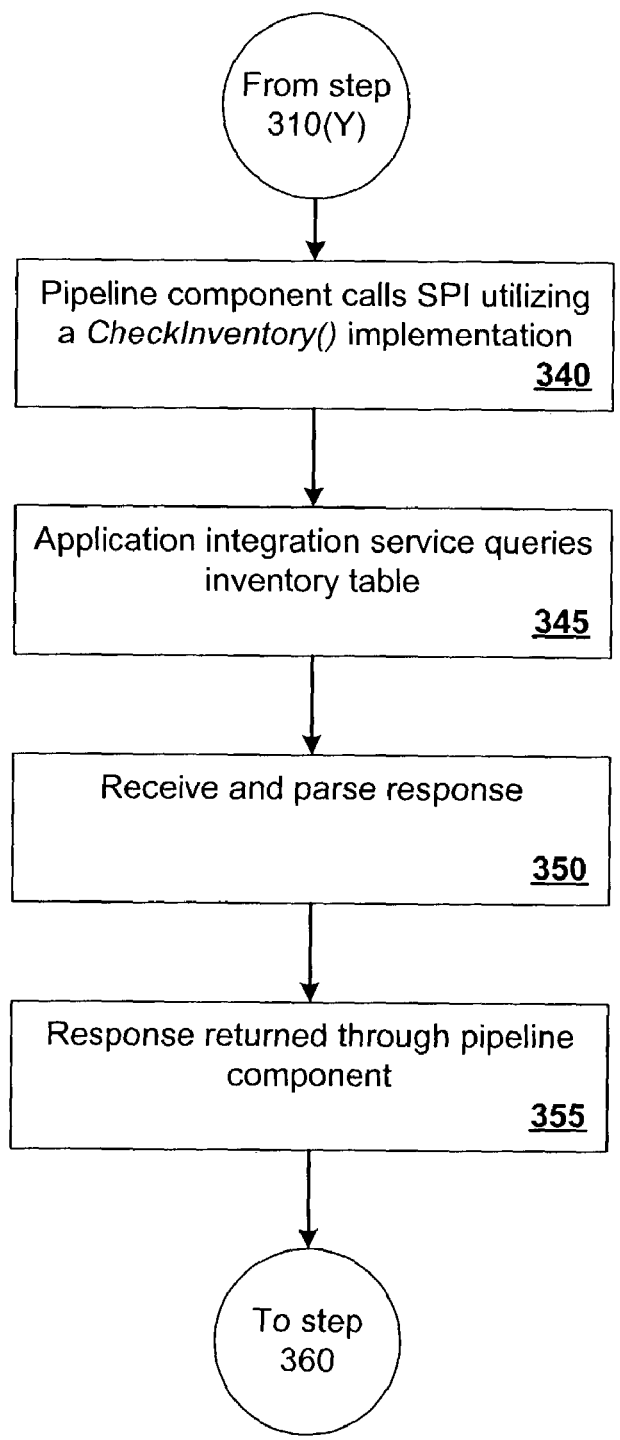
Figure 3C:
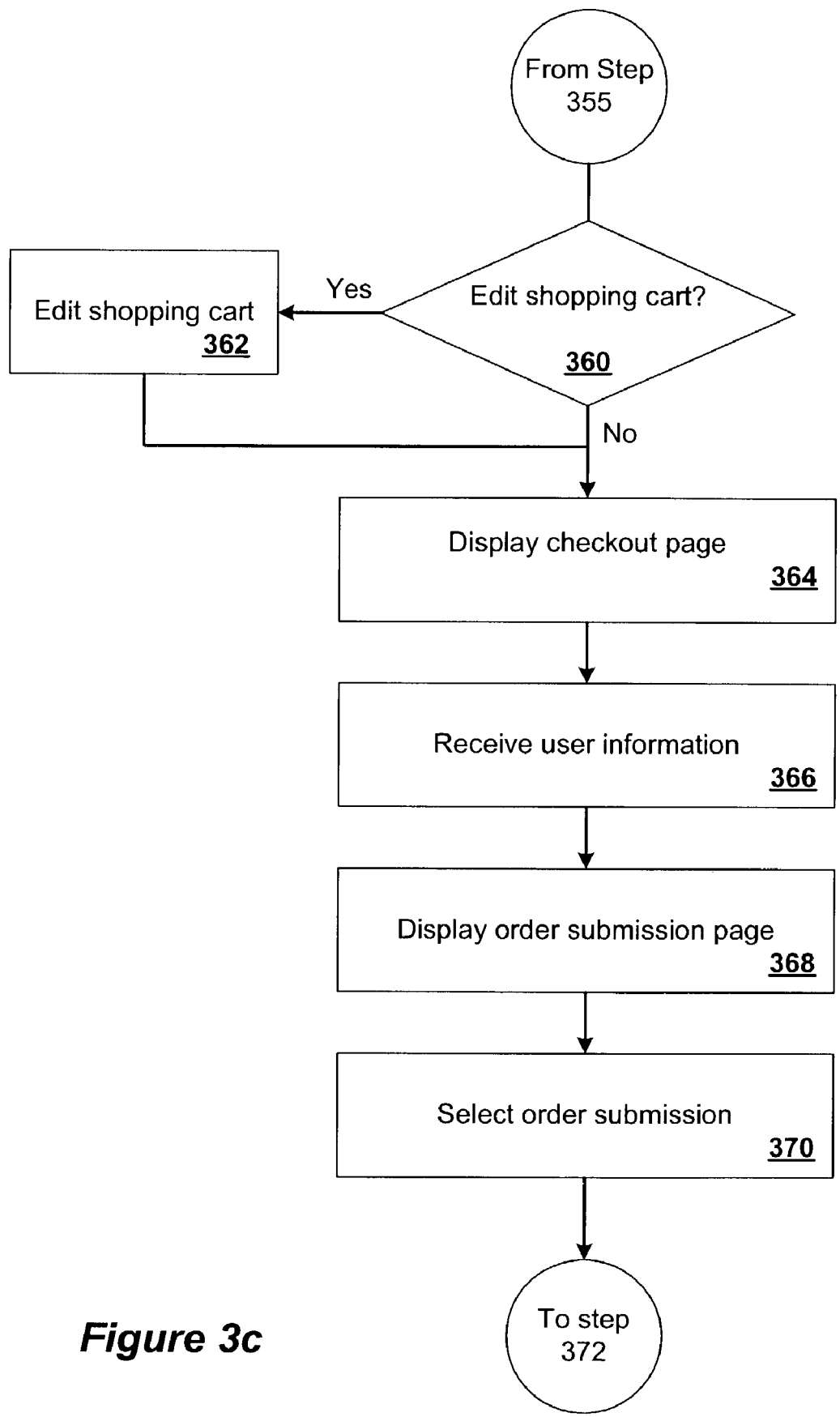
Figure 3D:
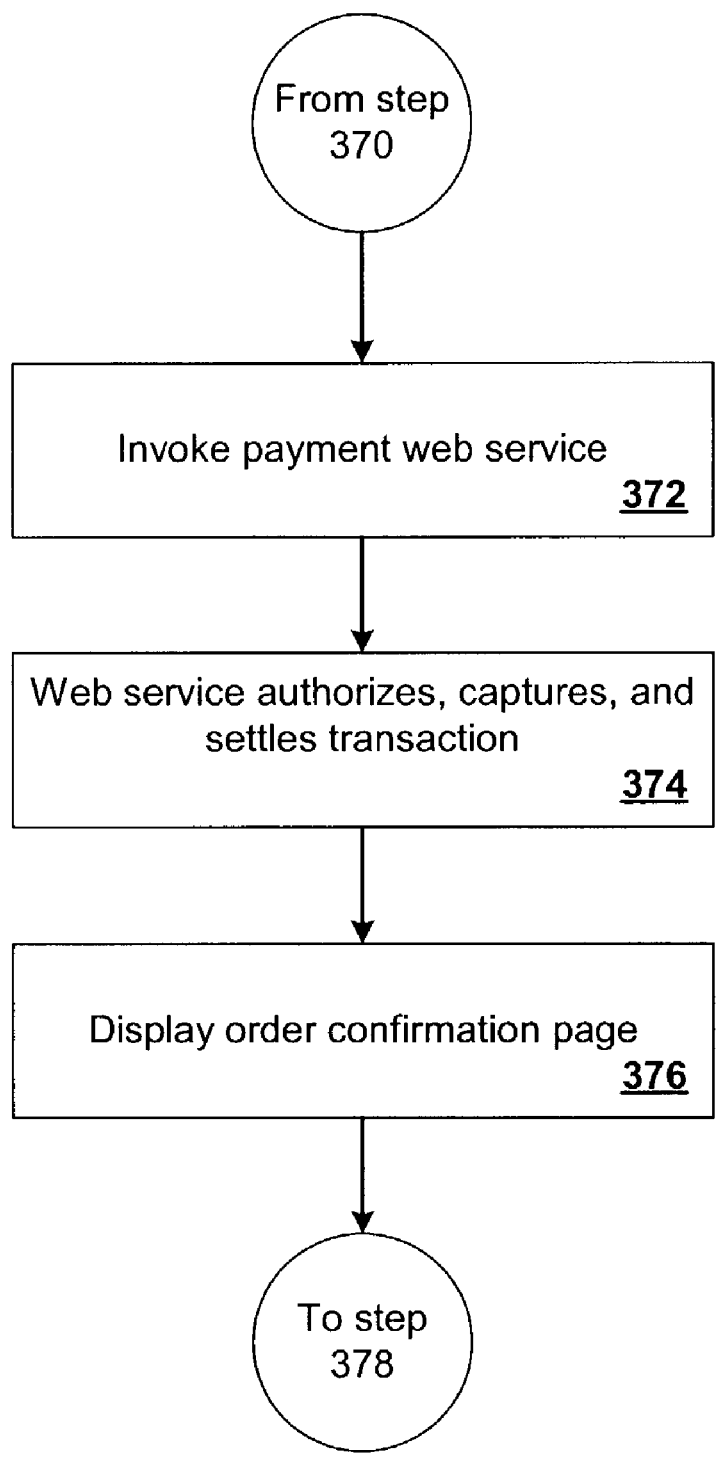
Figure 3E:
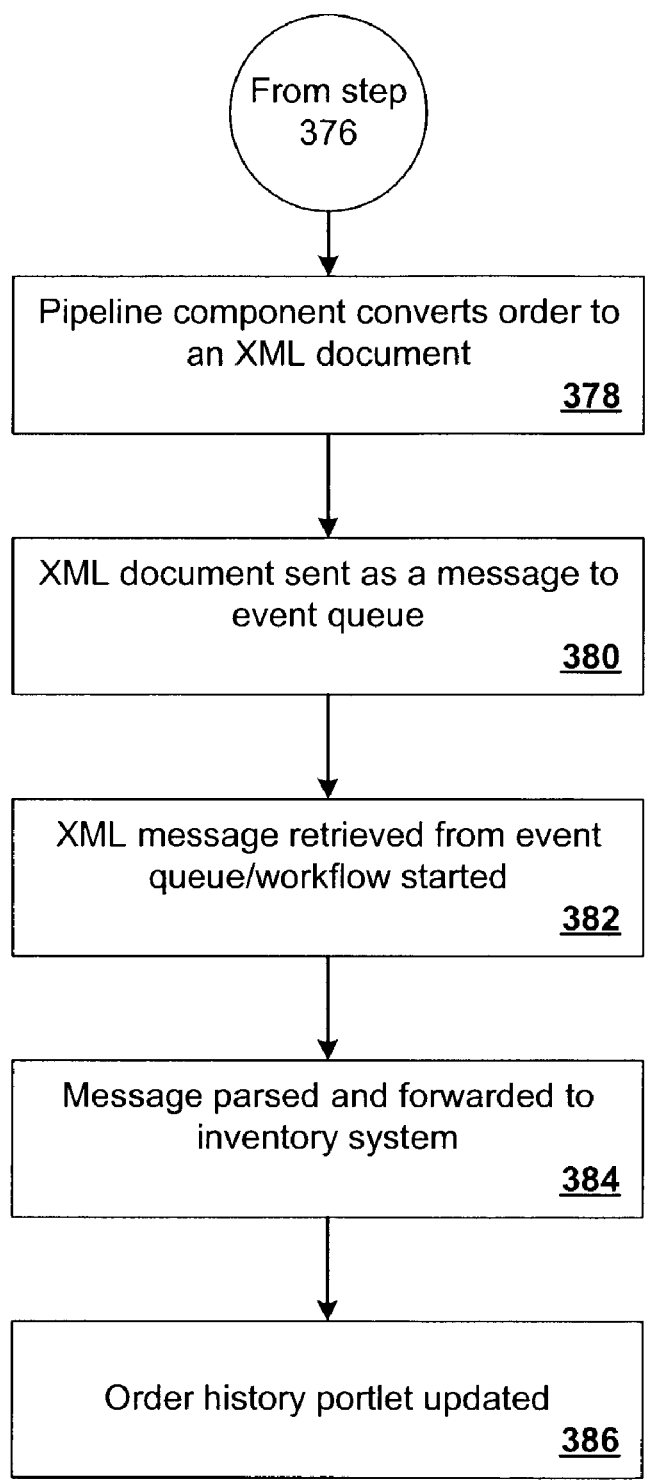

If the user selects the checkout feature from shopping cart portlet 407 or from shopping cart page 416 of portal 205 at step 310, a real-time inventory validation of the product item(s) being ordered can be performed as illustrated in FIG. 3a. In other embodiments in accordance with the present invention, a real-time inventory validation is performed when the user selects a buy now feature, tries to add a product item to the shopping cart, or tries to update the quantity of an item already in the shopping cart.

In one approach to performing real-time inventory validation, portal framework 150 can make a call through integration framework 115 to a back-end inventory system such as inventory management system 145. Inventory management system 145 can include an inventory table or database with information about product and part inventory information and can be accessed through application integration 130.

Pipeline component 220 (e.g., CheckInventoryPC) can be used to call service provider interface 225 (SPI) (e.g., InventoryProvider). SPI 225 can be implemented as a stateless session enterprise Java bean (EJB) and can contain various remote methods for performing inventory operations such as: public int checkInventory( ); public List get ProductInventory( ); and public List get ProductPartInventory( ). List can contain Inventory objects, where an Inventory object can be an interface implemented as shown below.

```
package examples.e2e.b2b;
public interface Inventory {
/**
 * Returns the identifier for the inventory oibject.
 */
public String id( );
/**
 * Returns a description for the inventory object.
 */
public String description( );
/**
 * Returns the minimum quantity of this inventory object that
 * should be maintained in stock.
 */
public long min( );
/**
 * Returns the maximum quantity of this inventory object that
 * should be maintained in stock.
 */
public long max( );
/**
 * Returns the current quantity of this inventory object.
 */
public long max( );
}.
```

In one embodiment, SPI 225 can be implemented utilizing related environment variables from an ejb-jar.xml file described using the <env-entry-name> tag. Pipeline component 220 can call SPI 225, utilizing the functionality provided by an inventory method such as a CheckInventory implementation method of SPI 225 at step 340. CheckInventory( ) can utilize application integration 130 to call a pre-configured application integration service. The service can query inventory table 145 to determine product availability at step 345. In one embodiment, an inventory check and response is sent as an XML document using standards-based transport protocols or standards-compliant protocols such as SOAP. In other embodiments, a JCA can be used. After receiving a response from application integration 130, CheckInventory( ) can call an XML helper to parse the response at step 350. It will be appreciated that numerous implementations of SPI 225 can be made depending on an application's requirements, including the requirements of any back-end management system.

An integer representation of the response can be returned through pipeline component 220 at step 355. Portal framework 150 can display the inventory response through a portlet within portal 205. In one embodiment, a message is displayed within portal 205 indicating unavailability if the inventory is insufficient to fulfill the order. In other embodiments, portal framework 150 can additionally utilize a pricing service to calculate and display any applicable discount for the product(s) selected by the user. If the inventory for a selected product(s) is unavailable, the user can update the quantity of the selected product or remove the product from the shopping cart (steps 360-362).

Figure 4E:
Figure 4F:

After validating the availability of all selected products, a checkout page can be displayed as shown in FIG. 4e at step 364. At the checkout page, the user can enter various information such as a billing/shipping addresses, shipping method, credit card information, and contact information at step 366. After selecting continue order from the checkout page, portal framework 150 can display an order submission page to the user as shown in FIG. 4f at step 368.

Figure 4G:
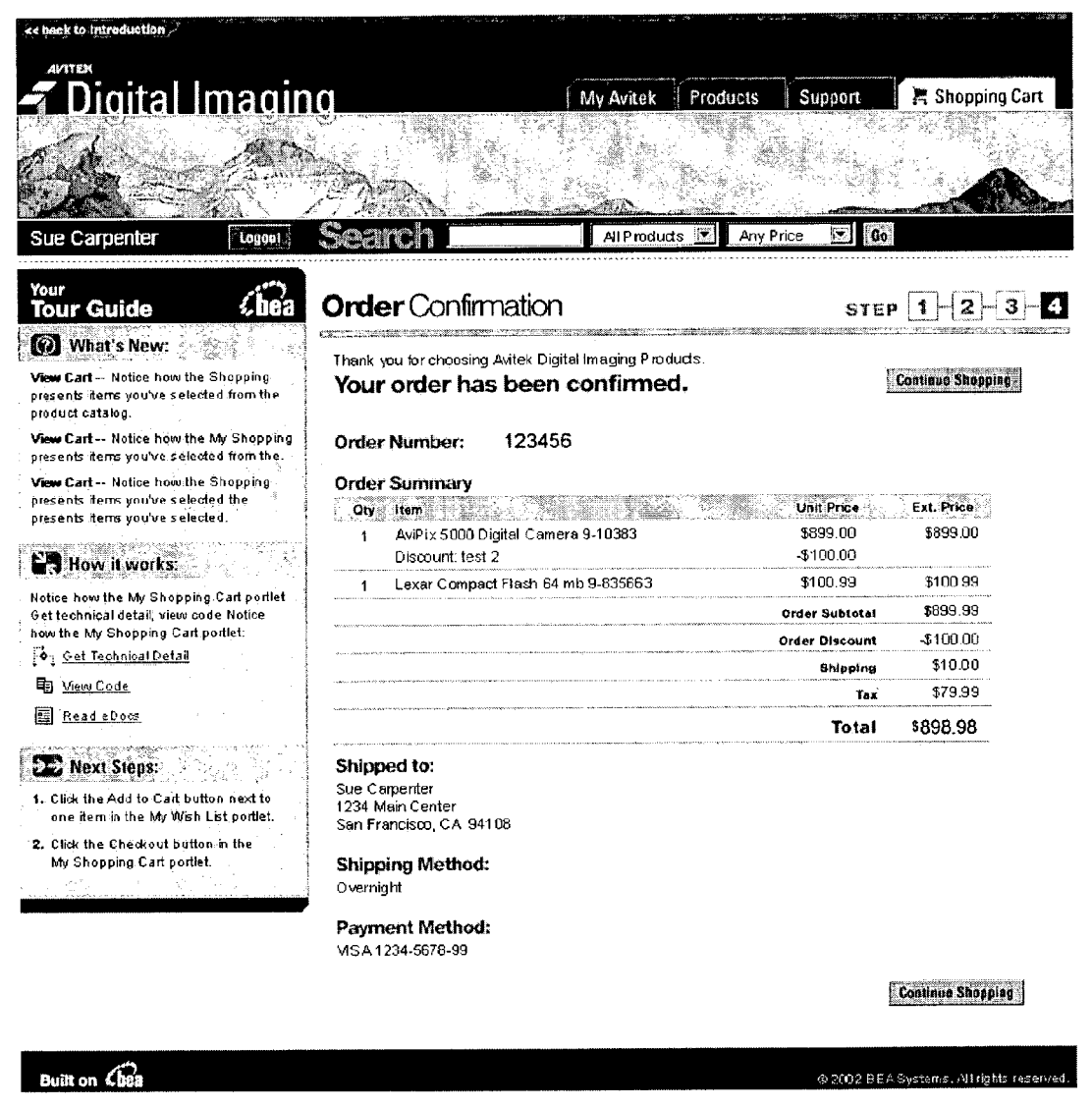

From the order submission page, the user can review and validate their order. After selecting submit order at step 370, portal framework 150 can access payment processing web service 170 for credit card authorization, capture, and settlement at step 372. Web service 170 can support various calls, such as authorize, capture, and settle, wherein a "true" response can be returned by web service 170 in response to one of the calls. An authorize call can accept a credit card number as an argument, for example, while a capture call can accept an amount to be captured. A web proxy can be used to call web service 170 from pipeline component 210, wherein pipeline component 210 can make the calls to web service 170 in succession. Web service 170 can then authorize, capture, and settle the credit card authorization at step 374. After receiving an authorization from web service 170, portal manager 155 can display an order confirmation page to the user at step 376 as illustrated in FIG. 4g.

After authorization and display of the order confirmation page, portal framework 150 can begin management of the order. When the order is persisted, an XML representation of the order can be created and placed on event queue 175. In one embodiment, event queue 175 is a JMS event queue. The XML representation of the order can be submitted by a pipeline component to event queue 175, thus enabling asynchronous communication between the queue and integration framework 115.

Portal manager 155, which can render portal 205, can be in communication with pipeline component 230 (e.g., Convert OrderRepPC) which can call SPI 235 (e.g., PurchaseManager). SPI 235 can be implemented as a stateless session EJB and can contain various remote methods for performing operations regarding orders, queries for price and availability, and purchase orders, such as: queueOrder; queueQPA; and queuePORequest.

In one embodiment, SPI 235 can be implemented utilizing related environment variables from an ejb-jar.xml file described using the <env-entry-name> tag. Pipeline component 230 can covert the order generated within portal framework 150 to an XML message at step 378. An exemplary XML representation of an order is illustrated below.

```
<?xml version="1.0" encoding="UTF-8"?>
<wlcs_order customer_id="democustomer" id="14004" status="SUBMITTED">
    <price>
        <amount>4309.11</amount>
        <currency>USD</currency>
    </price>
    <special instruction>please use a lot of bubble wrap..
    </special_instruction>
    <shipping>
    <splitting_preference>Ship all at once</splitting_preference>
    <subtotal>4099.2</subtotal>
    <lines>
        <line id="14005">
            <quantity>3.0</quantity>
            <product_id>9-33305</product_id>
            <tax>
            <shipping>
                <amount>2.475</amount>
                <currency>USD</currency>
            </shipping>
            <unit_price>
                <amount>973.95</amount>
                <currency>USD</currency>
            </unit_price>
            <msrp>
                <amount>1149.95</amount>
                <currency>USD</currency>
            </msrp>
            <description>tool set-933305</description>
            <total_amount>2921.85</total_amount>
        </line>
        <line id="14006">
        <line id="14007">
    </lines>
</wlcs_order>
```

Pipeline component 230 can call SPI 235, invoking an order processing method such as a queueOrder( ) implementation method of SPI 235. The XML message can be sent to event queue 175 to which a workflow 240 within business process management 125 is subscribed at step 380. Event processor 135 can retrieve the XML representation of the order for processing at step 382. A workflow can be a representation of a business process, enabling the orchestration of the execution of business logic and the exchange of business documents among back-end systems, users, and trading partners (systems and users) in a loosely coupled fashion. In one embodiment, the XML representation of the order is sent as a JMS XML message and event queue 175 is a JMS queue.

The JMS XML message can start workflow 240 or trigger a workflow event listened to by a running instance of the workflow 240. After retrieval of the message from JMS queue 175, workflow 240 can parse the XML message and forward all the input data to back end inventory system 145 at step 384. Portal framework 150 can update an order history portlet to reflect the order status at step 386.

Business-to-Business

Portal framework 150 and integration framework 115 can additionally simplify and ease the creation of enterprise applications for application developers developing business-to-business applications. Consider the following example of a business-to-business enterprise application utilizing portal framework 150 and integration framework 115 running on application server 110. This example will illustrate various functionality capable of monitoring a database, soliciting information from external sources, and using the information to formulate and transmit requirement information from one of the external sources. Such functionality can be beneficial in applications where a level of inventory is to be maintained and requirements for the inventory can be procured from various sources. The following example illustrates an application involving a purchasing agent for an entity accessing an electronic database representing an inventory, selecting a product to purchase, sending a query for price and availability to multiple suppliers, receiving quotes for pricing and availability, and formulating a purchase order for the item to be sent to one of the suppliers.

Figure 5:
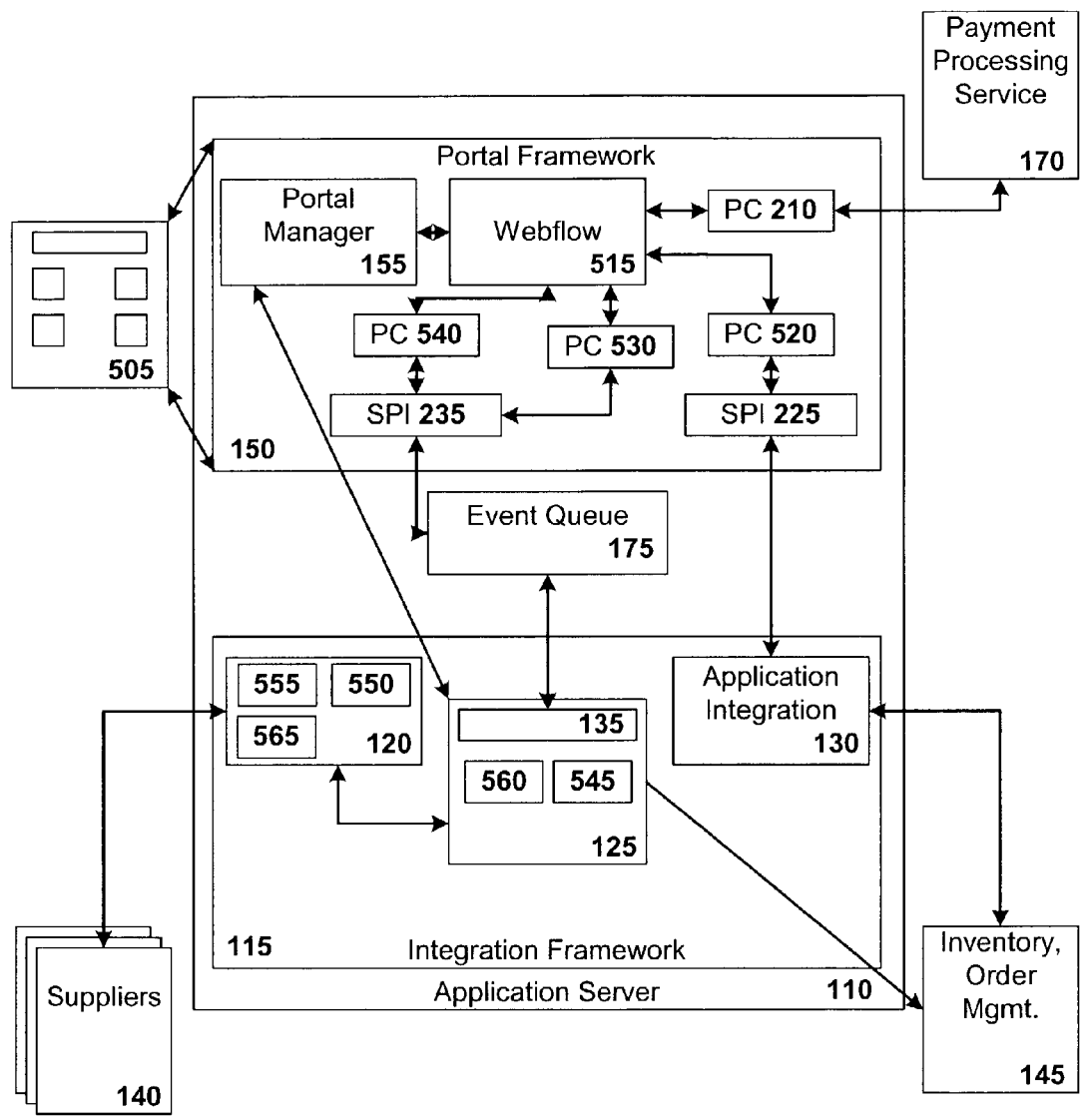
FIG. 5 is a high level block diagram of various software components of a computer supporting a configurable electronic business system in accordance with an embodiment of the invention that can be used to implement an enterprise application.
Figure 6A:
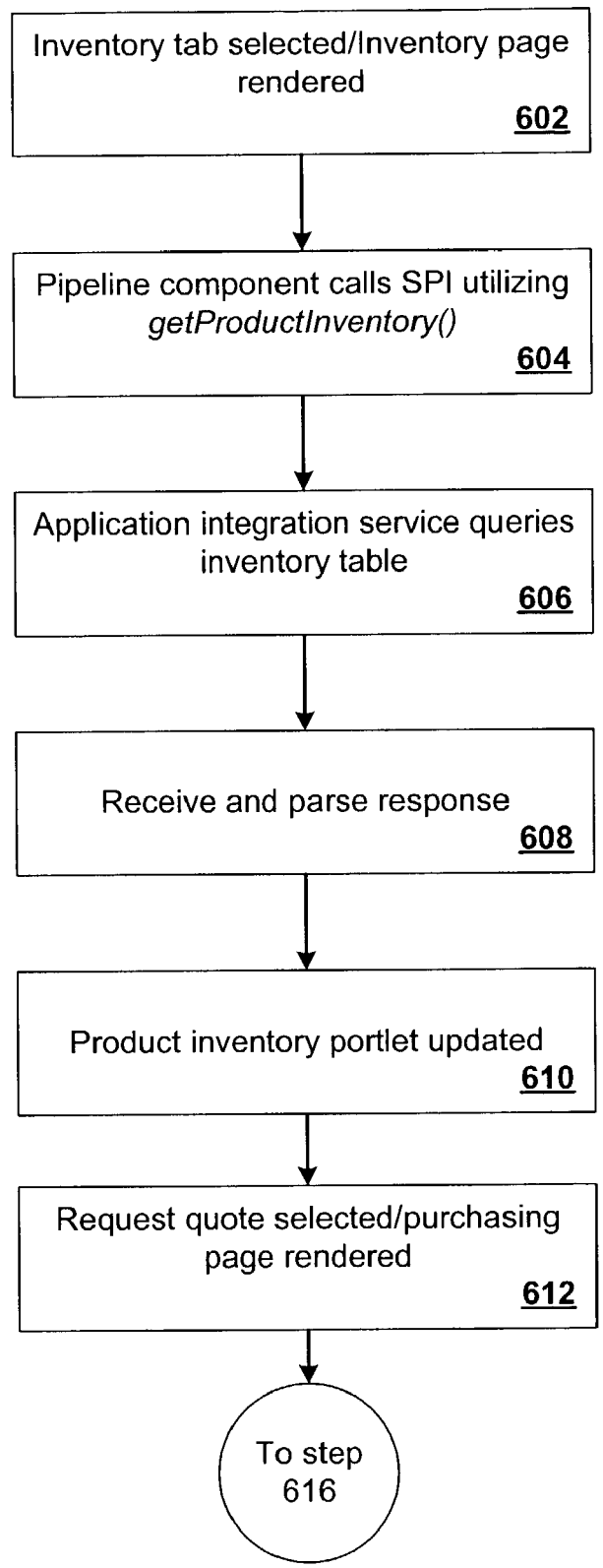
FIGS. 6a-6c are flowcharts illustrating the interaction of the various software components of FIG. 5 that can be used to implement the enterprise application.
Figure 6B:
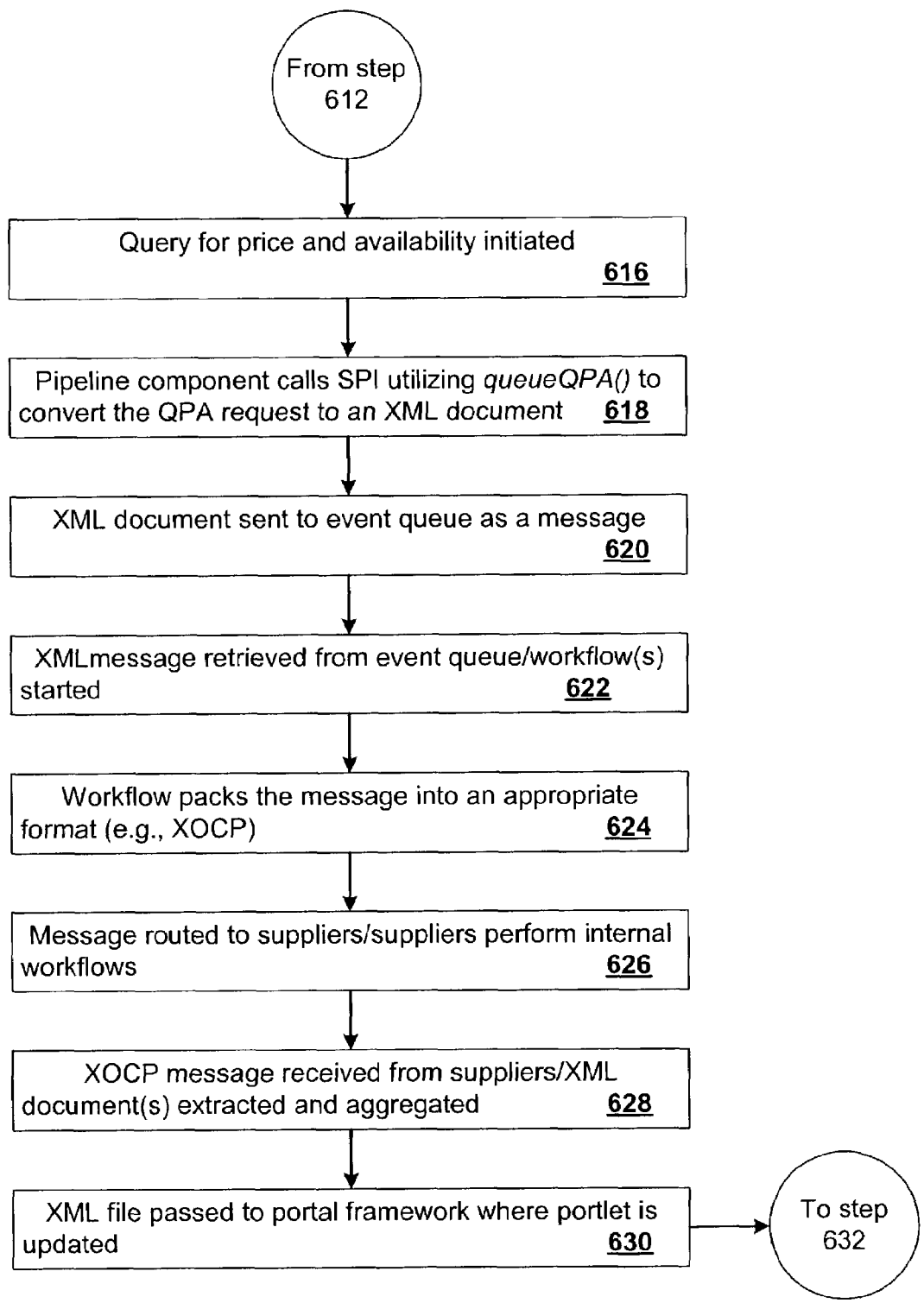
Figure 6C:
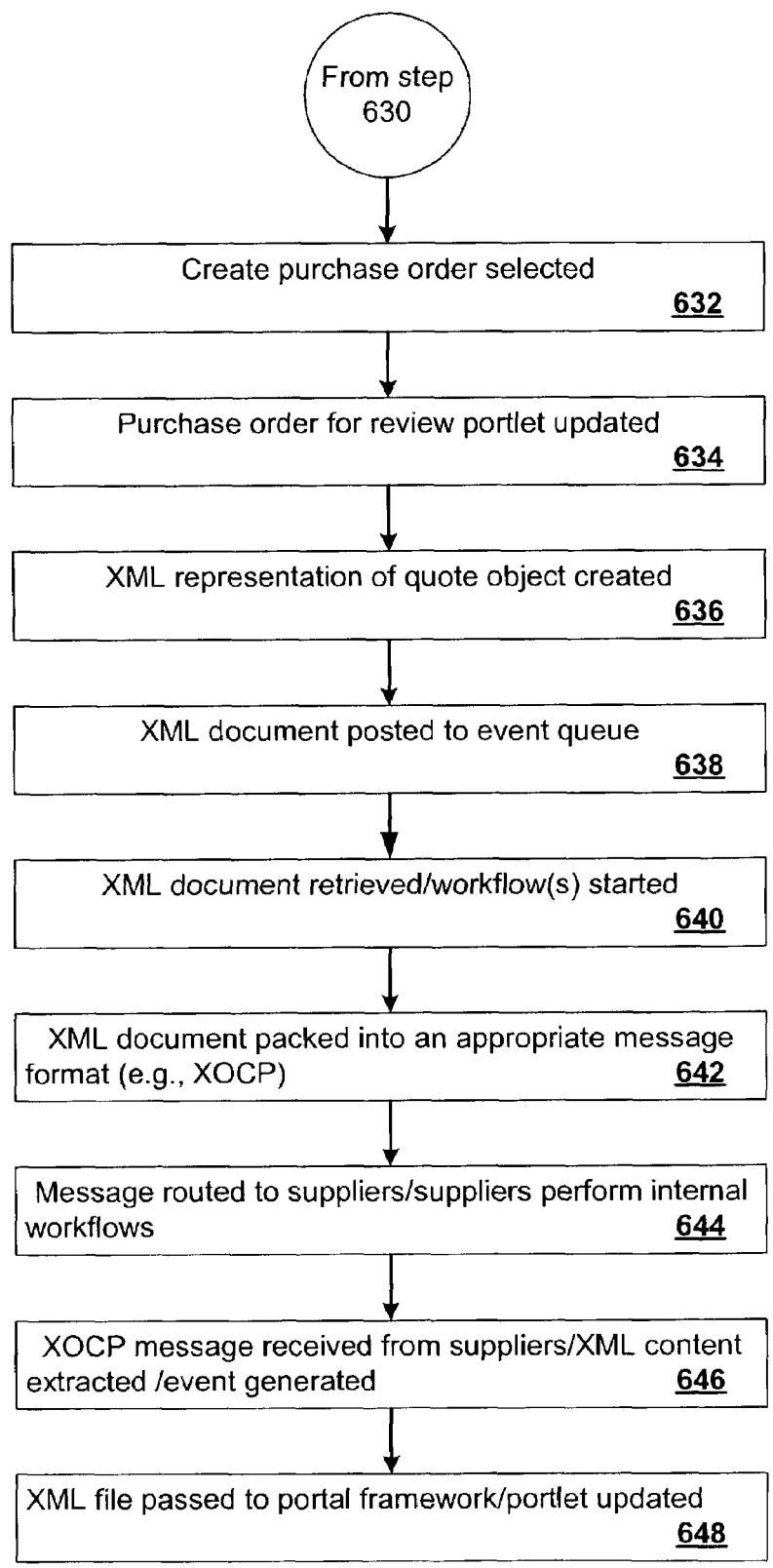

FIG. 5 is a high level block diagram of various software components of a computer network supporting a configurable electronic business system in accordance with the present invention that can be used to implement the following enterprise application. FIGS. 6a-6c are flowcharts illustrating the interaction of the various software components of FIG. 2 used to implement the enterprise application.

Figure 7A:
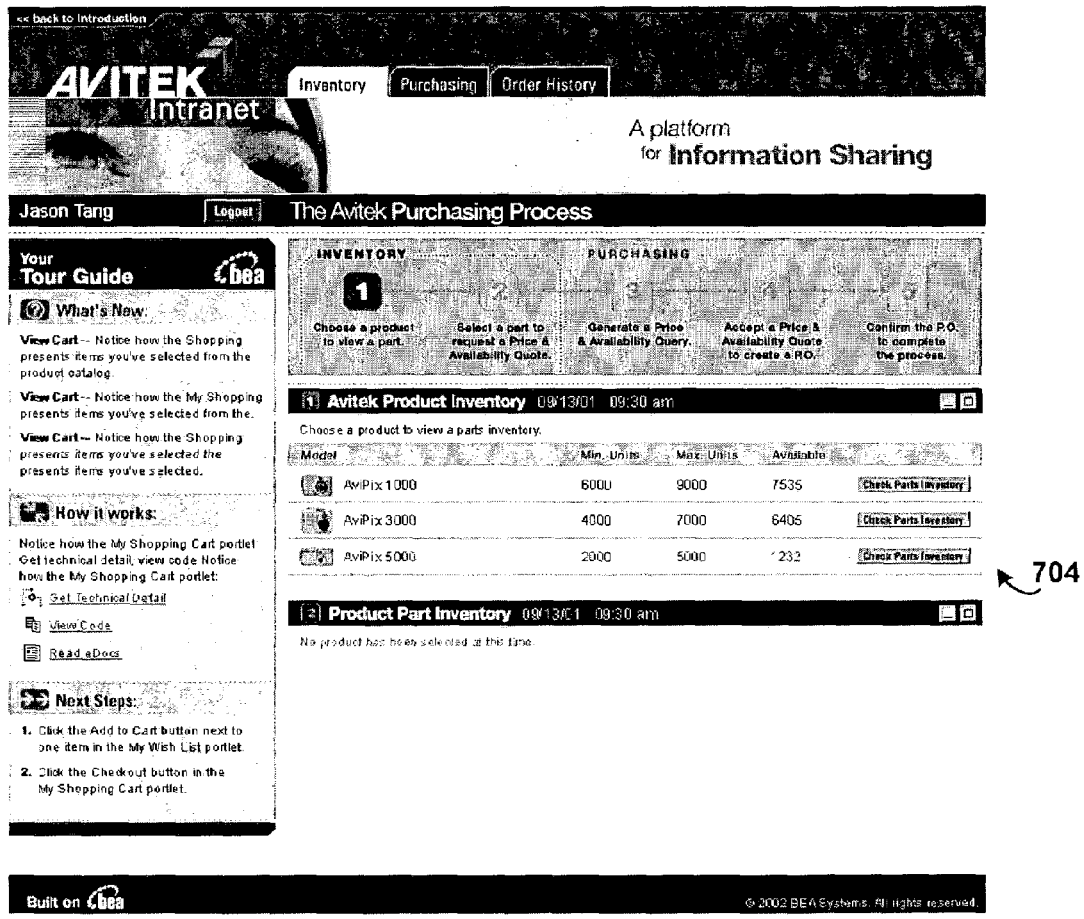

A user, such as a purchasing agent, can be automatically logged into portal framework 150. Other methods can also be used to indicate to portal framework 150 the identity of the user such that webflow 515 and portal manager 155 can render a personalized page such as a homepage within portal 505. Portal 505 can include tabs representing various pages within the portal. By selecting a tab, portal framework 150 can generate and/or gather the necessary resources (JSP's, XML definition files, etc.) such that the appropriate portal page represented by the tab is rendered. At step 602, the user can select an inventory tab 702 to view an inventory page as illustrated in FIG. 7a.

In order to determine and display the inventory information to the user, portal framework 150 can make a call through integration framework 115 to a back-end inventory system such as inventory management system 145, using similar functionality as discussed above with regards to the consumer example. Portal framework 150 can include a pipeline component 520 (e.g., GetInventoryPC) that can call service provider interface 225 (e.g., Inventory Provider). As previously discussed, SPI 225 can be implemented as a stateless EJB and can include various remote methods for performing inventory operations such as getProductionInventory( ) and getProductPartInventory( ).

To determine product inventory, pipeline component 520 can call SPI 225, utilizing the functionality provided by a product inventory method such as the getProductInventory( ) implementation method of an implementation of SPI 225 at step 604. GetProductInventory( ) can utilize application integration 130 to make a call using a pre-configured application integration service at step 606. This service can query inventory management system 145 to determine product inventory at step 606. After receiving a response from application integration 130, GetProductInventory( ) can call an XML helper to parse the response in order to create a List of Inventory objects at step 608. The List of Inventory objects can be returned to portal framework 150 which can render product inventory portlet 704, including the available inventory of the selected products at step 610.

Figure 7B:
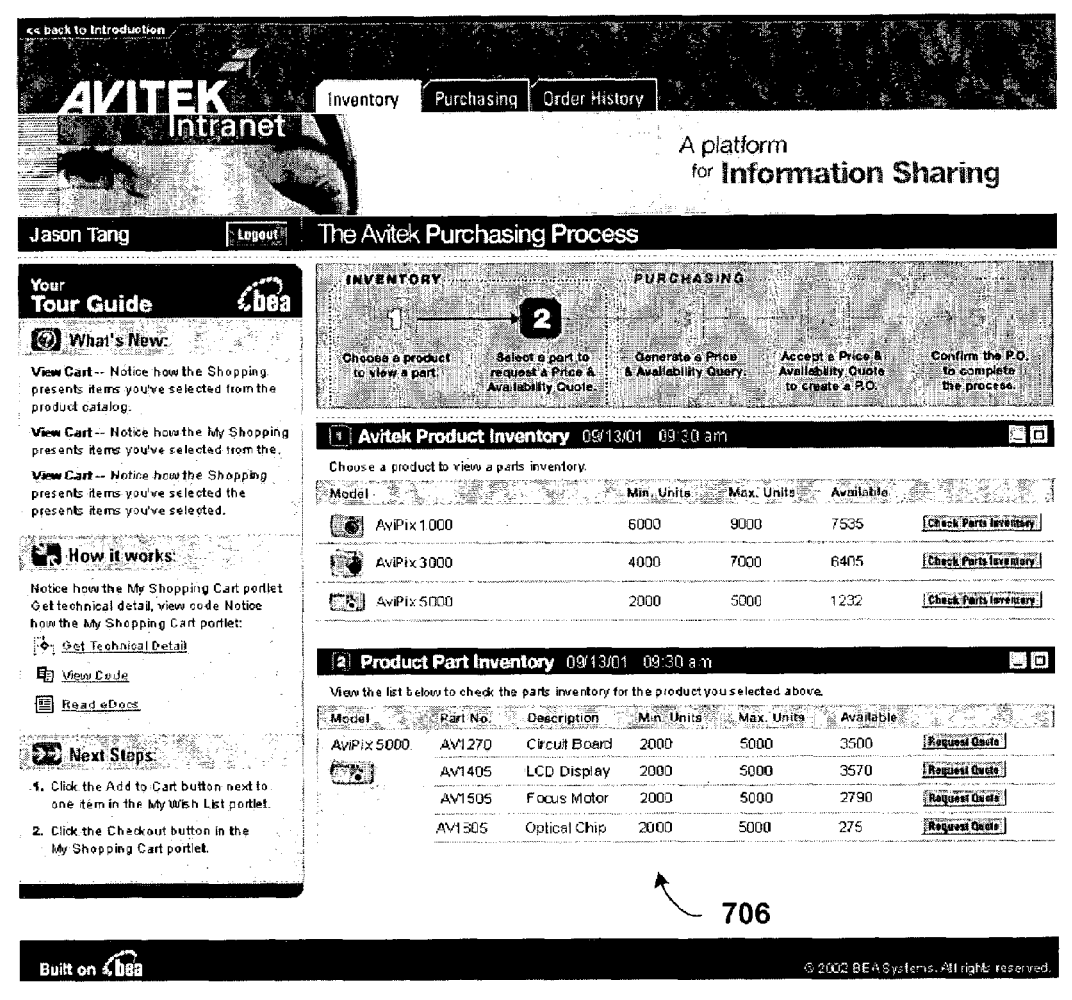

From the inventory page, a check parts inventory button can be selected for a product in order to view the inventory for the individual parts that comprise the product. To determine the parts inventory for a product, pipeline component 530 can call SPI 225, utilizing the functionality provided by a product part method such as the getProductPartInventory( ) implementation method. GetProductPartInventory( ) can utilize application integration 130 to make a call using a pre-configured application integration service. This service can query inventory management system 145 to determine the parts inventory for a product using a similar query as previously discussed. After receiving a response from application integration 130, GetProductPartInventory( )can call an XML helper to parse the response in order to create a List of Inventory objects. The List of Inventory objects can be returned to portal framework 150 which can render product part inventory portlet 706, including the available inventory of the products' parts, as illustrated in FIG. 7b.

Figure 7C:

From product part inventory portlet 706, the user can select the Request Quote button for a particular part. After the Request Quote button for a part is selected, portal framework 150 can render a purchasing page as illustrated in FIG. 7c at step 612. The purchasing page can include query for price and availability portlet 708. Within portlet 708, the user can enter information into the fields for quantity, unit price, and required receipt date. After entering the information, a query for price and availability (QPA) can be initiated when the user selects the send QPA request button within portlet 708 at step 616. A QPA object can be implemented as follows in one embodiment.

```
package examples.e2e.b2b;
import com.bea.commerce.ebusiness.price.quote.Money;
/**
 * Represents a query for price and availability that is to be
 comnmunicated to supplier(s).
 * @author Copyright (c) 2002 by BEA Systems, Inc. All Rights Reserved.
 */
public interface QPA {
/**
 * Returns the identifier for this QPA.
 */
public String requestId( );
/**
 * Returns the date this QPA was created.
 */
public Calendar creationDate( );
/**
 * Returns the identifier for the product to be quoted.
 */
public String productId( );
/**
 * Returns a description for the product to be quoted.
 */
public String description( );
/**
 * Returns the quantity of the product desired by the purchaser.
 */
public long desiredQty( );
/**
 * Returns the unit price desired by the purchaser.
 */
public Money desiredUnitPrice( );
/**
 * Returns the date the purchaser desires to receive the product.
 */
public Calendar desiredDate( );
}.
```

The information entered in portlet 706 can be delivered through portal manager 155 to QPA pipeline component 530. Pipeline component 530 can communicate with SPI 235 (e.g., Purchase Manager) to deliver QPA requests to integration framework 115. PC 530 can call SPI 235, invoking a query method such as the queueQPA( ) implementation method of SPI 235.

QueueQPA( ) can convert the QPA request to an XML document representing the order at step 618. In one embodiment, queueQPA( ) calls an XML helper to generate the XML representation. The XML representation can be sent to event queue 175 at step 620. In one embodiment, the XML representation of the order is sent as a JMS XML message and event queue 175 is a JMS queue.

Workflow 545 in BPM 125 can be subscribed to event queue 175 such that event processor 135 can retrieve the XML representation of the QPA request for processing. Upon retrieval of the XML message, workflow 545 can be initiated or a workflow event listened to by a running instance of workflow 545 can be triggered at step 622. After retrieval of the message from event queue 175, workflow 545 can invoke workflow 550 within business-to-business integration 120 (B2Bi), passing it the QPA request XML document and initiating a QPA conversation.

B2Bi 120 can communicate with suppliers 140 using a number of standards-based business protocols depending on a collaboration agreement with the suppliers. For example, in one embodiment, the eXtensible Open Collaboration Protocol (XOCP) is used for communication between integration framework 115 and suppliers 140. In other embodiments, RosettaNet, cXML, and ebXML messages can also be used.

If XOCP is used, workflow 550 can pack the QPA request XML document into an XOCP message for distribution to suppliers 140 at step 624. B2Bi 120 can route the message to the various suppliers 140, based on the registered collaboration agreements with the suppliers at step 626. In one embodiment, a third workflow 555 is invoked to route the message to the suppliers. Suppliers 140 can receive the XOCP message and extract the QPA request XML document. The receipt of the message can initiate private workflows within the suppliers' systems designed to create QPA responses. Each supplier's QPA response can be created as an XML document. The suppliers can pack the QPA response XML document into an XOCP message that can be sent to integration framework 115 and on to B2Bi 120.

Figure 7D:
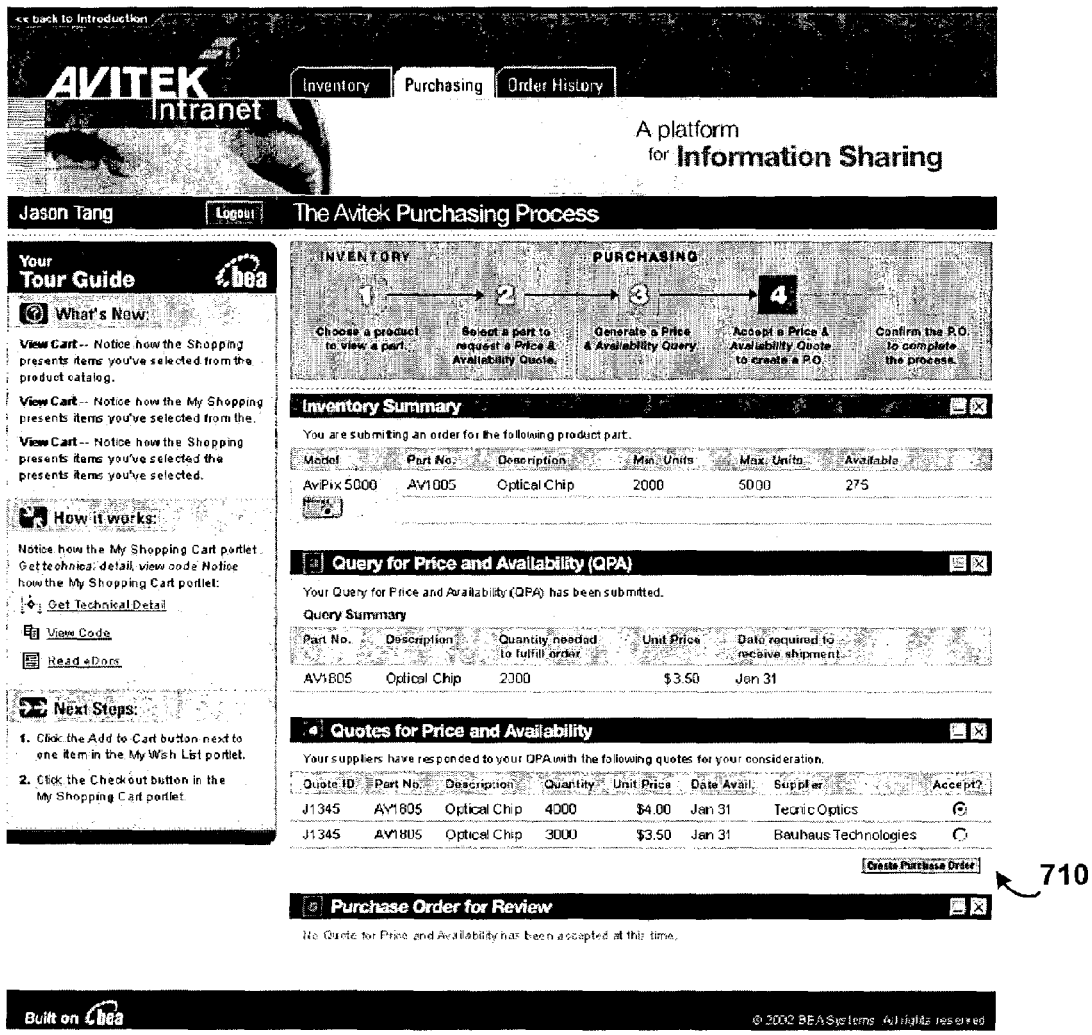

Public workflow 550 can receive the XOCP message from the suppliers and extract the QPA response XML document at step 628. In one embodiment, workflow 555 is used to receive the XOCP message from the suppliers and route it to workflow 550. If more than one QPA response is received in the XOCP message workflow 550 can aggregate the response documents into a single XML document and post the document, using a JMS queue for example, to private workflow 545. The QPA conversation can then be terminated and public workflow 550 notified. Workflow 545 can receive the aggregated QPA response XML document and write it to an XML file. The XML file can be passed from integration framework to portal framework 150 where portal manager 155 can update the quotes for price and availability portlet 710 with the response information at step 630 as illustrated in FIG. 7d. In one embodiment, a quote pipeline component can be invoked to create Quote objects from the aggregated XML file that can be displayed in portlet 710. The pipeline component can invoke an XML helper to parse the XML file.

Figure 7E:

The user can access portlet 710 and review the QPA responses, accept one of the suppliers' QPA response, and choose to create a purchase order at step 632. Portal framework 150 can update purchase order for review portlet 712 to indicate the selected QPA response at step 634 as illustrated in FIG. 7e.

Pipeline component 540 can deliver the purchase order data to integration component 115 using SPI 235. For example, by using a purchase order method such as the queuePO( ) implementation method, a Quote object can be sent from PC 540 to SPI 235. An exemplary Quote object can be implemented as shown below.

```
package examples.e2e.b2b;
import com.bea.commerce.ebusiness.price.quote.Money;
/**
 * Represents a query for price and availability that is to be communicated
 * to supplier(s).
 * @author Copyright (c) 2002 by BEA Systems, Inc. All Rights Reserved.
 */
public interface Quote {
/**
 * Returns the identifier for the QPA that precipitated this quote.
 */
public String requestId( );
/**
 * Returns the identifier for this quote.
 */
public String quoteId( );
/**
 * Returns the date this QPA was created.
 */
public Calendar qpaCreationDate( );
/**
 * Returns the date this quote was generated by the supplier.
 */
public Calendar quoteDate( );
/**
 * Returns the name of the supplier who sent this quote.
 */
public String supplierName( );
/**
 * Returns the identifier for the product quoted.
 */
public String productId( );
/**
 * Returns a description for the product quoted.
 */
public String description( );
/**
 * Returns the quantity of the product promised by the supplier.
 */
public long quotedQty( );
/**
 * Returns the unit price quoted by the supplier.
 */
public Money quotedUnitPrice( );
/**
 * Returns the date promised by the supplier.
 */
public Calendar promiseDate( );
}.
```

QueuePO( ) can call an XML helper to create an XML representation of the Quote object at step 636. The XML document can be posted to event queue 175 at step 638. In one embodiment, the XML document is transmitted as a JMS message and event queue 175 is a JMS queue. The posting of the XML document can invoke workflow 545 in business process management 125 at step 640. Workflow 545 can invoke purchase order (PO) private workflow 560 which can invoke PO public workflow 565. PO public workflow 565 can wrap the XML document into an XOCP message or other agreed format at step 642. The XOCP message can be sent to the appropriate supplier, initiating a PO conversation at step 644. In one embodiment, the XOCP message invokes a public workflow for the suppliers that extracts the PO XML document and starts the selected supplier's private workflow by passing it the XML document.

Figure 7F:
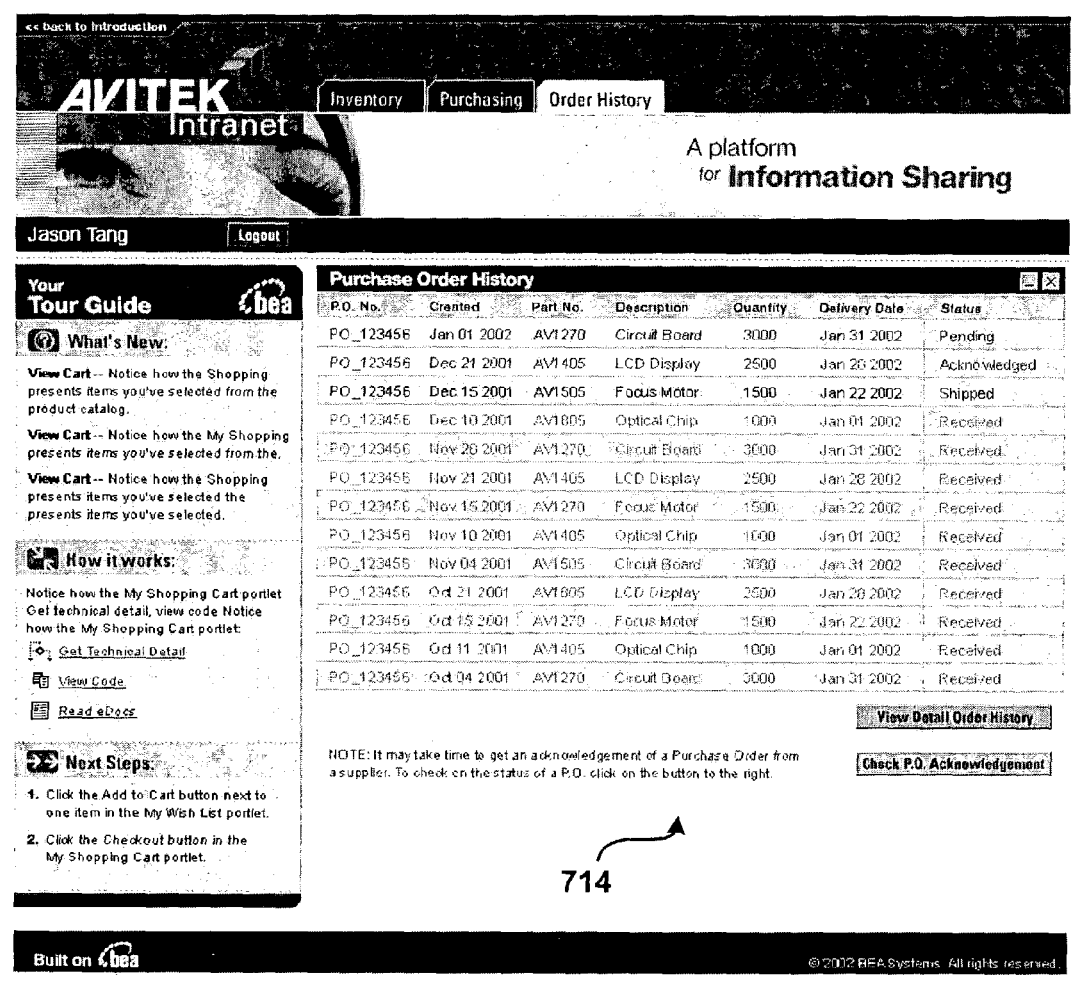

Upon receipt of the XML document, the supplier's private workflow can translate the XML PO data into binary data or another suitable data format, generate a PO acknowledgment, translate the acknowledgment to an XML document, and pass the document to the suppliers' public workflow. The suppliers' public workflow can wrap the XML acknowledgment in an XOCP message that can be sent to public workflow 565 where the XML content can be extracted from the XOCP message and an XML event sent to private workflow 560, ending the PO conversation at step 646. Workflow 560 can write the PO acknowledgment information to an XML file as well as update the PO information within enterprise information systems. The XML file can be passed from integration framework 115 to portal framework 150 where portal manager 155 can update purchase order history portlet 714, as illustrated in FIG. 7f (step 648). Portlet 714 can display a pending status until the acknowledgment is received. In one embodiment, a PO status pipeline component can be invoked to create PO objects from the XML file generated by workflow 560 to be used in order history portlet 714. The pipeline component can invoke an XML helper to parse the XML file. An exemplary PO object can be implemented as shown below.

```
package examples.e2e.b2b;
import com.bea.commerce.ebusiness.price.quote.Money;
/**
 * Represents a query for price and availability that is to be
 communicated
 * to supplier(s).
 * @author Copyright (c) 2002 by BEA Systems, Inc. All Rights
 Reserved.
 */
public interface PO {
/**
 * Returns the identifier for this purchase order.
 */
public Dytinh poNumber( )f;
/**
 * Returns the date this PO was created.
 */
public Calendar creationDate( );
/**
 * Returns the status of this PO. This value is generally
 * one of Pending, Acknowledged, Shipped or Received.
 */
public String status( );
/**
 * Returns the name of the supplier associated with this PO.
 */
public String supplierName( );
/**
 * Returns the identifier for the product supplied.
 */
public String productId( );
/**
 * Returns a description for the product supplied.
 */
public String description( );
/**
 * Returns the quantity of the product supplied.
 */
public long qty( );
/**
 * Returns the unit price for each item supplied.
 */
public Money unitPrice( );
/**
 * Returns the date promised by the supplier.
 */
public Calendar promiseDate( );
/**
 * Returns the total cost for the PO.
 */
public Money total( );
}.
```

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

What is claimed is:

1. A system for accessing a resource, comprising:
    an integration framework, the integration framework adapted to provide access to the resource, the integration framework including business to business integration and business process management, the integration framework providing application integration for multiple internal and external applications; and
    a portal framework, the portal framework adapted to generate a portal providing an interface to the resource, the portal framework including:
    a portal manager adapted to collect resources to render a web page within the portal,
    web flow adapted to control a flow of a user's session through web pages displayed in a browser, wherein the web pages are associated with the portal, and
    a pipeline component adapted to execute an operation using at least one of information received through the portal, information received from an external service, and information received from the integration framework.

2. The system of claim 1, wherein the portal is manager adapted to manage content used in rendering the portal.

3. The system of claim 1, wherein the webflow is adapted to execute logic to render content for the portal.

4. The system of claim 3, wherein the webflow tracks and modifies the portal based upon at least one of information received through the portal, information received from an external service, and information received from the integration framework.

5. The system of claim 1, wherein the pipeline component is adapted to communicate with resources external to the portal framework.

6. The system of claim 5, wherein the pipeline component is adapted to communicate with at least one of a web service, an event queue, and the integration framework.

7. The system of claim 1, wherein the integration framework comprises:
    a management component, the management component adapted to manage the flow of information within the integration framework.

8. The system of claim 1, further comprising:
    an application server;
    wherein the integration framework comprises:
        an application integration component, the application integration component adapted to integrate at least one application with the application server.

9. The system of claim 1, further comprising:
    an event queue, the event queue adapted to queue messages for exchange between the portal framework and the integration framework.

10. The system of claim 1, wherein the integration framework and the portal framework can communicate using a standards-compliant communication protocol.

11. The system of claim 10, wherein the standards-compliant communication protocol is a Java enabled standards-compliant communication protocol.

12. The system of claim 11, wherein the Java enabled standards-compliant communication protocol is Java messaging service.

13. The system of claim 11, wherein the Java enabled standards-compliant communication protocol is Java connector architecture.

14. The system of claim 1, wherein the integration framework and the portal framework can communicate using a Java enabled communication protocol.

15. The system of claim 1, wherein the integration framework and the portal framework can communicate using Java connector architecture.

16. The system of claim 1, wherein the integration framework and the portal framework can communicate using Java messaging service.

17. The system of claim 1, wherein the integration framework and the portal framework are implemented on an application server.

18. The system of claim 1, wherein the portal framework is adapted to:
    receive information through the portal; and
    convert the information to an eXtensible markup language (XML) based document.

19. The system of claim 18, wherein the integration framework and portal framework can communicate by passing the XML based document.

20. The system of claim 1, wherein the resource includes at least one of an enterprise application, a legacy system, a database, and a web service.

21. A system for accessing an application through an application server, comprising:
    an integration framework, the integration framework adapted to provide access to the application, the integration framework providing application integration for multiple external and internal applications, the integration framework including business to business integration and business process management; and a portal framework, the portal framework adapted to generate a portal providing an interface to the application through the application server, the portal framework including;

a portal manager adapted to collect resources to render a web page within the portal, web flow adapted to control a flow of a user's session through web pages displayed in a browser, wherein the web pages are associated with the portal, and a pipeline component adapted to execute an operation using at least one of information received through the portal, information received from an external service, and information received from the integration framework.

22. A system for accessing a resource, comprising:

an application server;

an integration framework, the integration framework adapted to provide the application server with access to the resource, the integration framework providing application integration for multiple external and internal applications, the integration framework including business to business integration and business process management;

a portal framework, the portal framework adapted to generate a portal providing an interface to the resource through the application server, the portal framework including;

a portal manager adapted to collect resources to render a web page within the portal, web flow adapted to control a flow of a user's session through web pages displayed in a browser, wherein the web pages are associated with the portal, and a pipeline component adapted to execute an operation using at least one of information received through the portal, information received from an external service, and information received from the integration framework; and wherein the portal framework and the integration framework can communicate using a standards-compliant communication protocol.

23. The method of claim 22, further comprising:

converting the information to an XML-based document prior to passing the information to the integration framework.

24. A method for accessing a resource, comprising:

providing access to the resource through an integration framework, the integration framework including business to business integration and business process management; and providing an interface to the resource through a portal generated by a portal framework, the portal framework including:

a portal manager adapted to collect resources to render a web page within the portal, web flow adapted to control a flow of a user's session through web pages displayed in a browser, wherein the web pages are associated with the portal, and a pipeline component adapted to execute an operation using at least one of information received through the portal, information received from an external service, and information received from the integration framework.

25. The method of claim 24, further comprising:

receiving information from a user through the portal;

passing the information to the integration framework; and providing the information to the resource using the integration framework.

26. The method of claim 25, wherein the information is provided to the resource using Simple Object Access Protocol.

27. A computer-readable storage medium for accessing a resource, comprising:

means for providing access to the resource through an integration framework, the integration framework including business to business integration and business process management; and means for providing an interface to the resource through a portal generated by a portal framework, the portal framework including:

a portal manager adapted to collect resources to render a web page within the portal, web flow adapted to control a flow of a user's session through web pages displayed in a browser, wherein the web pages are associated with the portal, and a pipeline component adapted to execute an operation using at least one of information received through the portal, information received from an external service, and information received from the integration framework.

28. A computer program product stored on a computer readable storage medium or accessing a resource, comprising:

a computer usable medium having computer readable program code embodied therein for accessing the resource, the computer readable medium program code having:

computer readable program code for providing access to the resource through an integration framework, the integration framework providing application integration for multiple external and internal applications, the integration framework including business to business integration and business process management; and computer readable program code for providing an interface to the resource through a portal generated by a portal framework, the portal framework including:

a portal manager adapted to collect resources to render a web page within the portal, web flow adapted to control a flow of a user's session through web pages displayed in a browser, wherein the web pages are associated with the portal, and a pipeline component adapted to execute an operation using at least one of information received through the portal, information received from an external service, and information received from the integration framework.

29. A computer program product for accessing a resource, comprising:

computer code for providing access to the resource through an integration framework, the integration framework providing application integration for multiple applications, the integration framework including business to business integration and business process management; and computer code for providing an interface to the resource through a portal generated by a portal framework, the portal framework including;

a portal manager adapted to collect resources to render a web page within the portal, web flow adapted to control a flow of a user's session through web pages displayed in a browser, wherein the web pages are associated with the portal, and a pipeline component adapted to execute an operation using at least one of information received through the portal, information received from an external service, and information received from the integration framework.

* * * * *

UNITED STATES PATENT AND TRADEMARK OFFICE
CERTIFICATE OF CORRECTION

PATENT NO.       : 7,496,687 B2                                                 Page 1 of 2
APPLICATION NO.  : 10/427119
DATED            : February 24, 2009
INVENTOR(S)      : Griffin et al.

It is certified that error appears in the above-identified patent and that said Letters Patent is hereby corrected as shown below:

On the Title Pg Item (75), in "Inventors", line 9, delete "Boulder, CO (US)" and insert -- Edison, NJ (US) --, therefor.

On the Title Pg Item (56), on page 3, under "Other Publications", line 1-2, delete "Intergration" and insert -- Integration --, therefor.

On the Title Pg Item (56), on page 4, under "Other Publications", line 8, delete "Receviced" and insert -- Received --, therefor.

On the Title Pg Item (56), on page 4, under "Other Publications", line 19, delete "Join" and insert -- Joint --, therefor.

On the Title Pg Item (56), on page 4, under "Other Publications", line 33, delete "Toards" and insert -- Towards --, therefor.

On the Title Pg Item (56), on page 4, under "Other Publications", line 51, delete "for" and insert -- of --, therefor.

In column 2, line 48, before "of" insert -- method --.

In column 2, line 50, after "compute" insert -- network --.

In column 2, line 52, after "the" insert -- present --.

In column 4, line 1, delete "Oct. 15,2002," and insert -- Oct. 15, 2002, --, therefor.

Signed and Sealed this

Eighteenth Day of May, 2010

David J. Kappos
*Director of the United States Patent and Trademark Office*

CERTIFICATE OF CORRECTION (continued)
U.S. Pat. No. 7,496,687 B2

In column 7, line 32-33, delete "get ProductInventory();" and insert -- getProductInventory(); --, therefor.

In column 7, line 33, delete "get ProductPartInventory()." and insert -- getProductPartInventory(). --, therefor.

In column 7, line 64, delete "CheckInventory" and insert -- CheckInventory() --, therefor.

In column 10, line 38, delete "Inventory Provider" and insert -- InventoryProvider --, therefor.

In column 10, line 41, delete "getProductionInventory()" and insert -- getProductInventory() --, therefor.

In column 11, line 3, delete "GetProductPartInventory( )can" and insert
-- GetProductPartInventory() can --, therefor.

In column 17, line 6, in claim 21, delete "including;" and insert -- including: --, therefor.

In column 17, line 28, in claim 22, delete "including;" and insert -- including: --, therefor.

In column 18, line 55, in claim 29, delete "including;" and insert -- including: --, therefor.